US012657854B2

(12) United States Patent
Huang et al.

(10) Patent No.: US 12,657,854 B2
(45) Date of Patent: Jun. 16, 2026

(54) GENERATION AND MODIFICATION OF TRAIT BASED AVATARS

(71) Applicant: GENIES, INC., West Hollywood, CA (US)

(72) Inventors: Justin Huang, Los Angeles, CA (US); Akash Raman Nigam, Venice, CA (US)

(73) Assignee: GENIES, INC., West Hollywood, CA (US)

( * ) Notice: Subject to any disclaimer, the term of this patent is extended or adjusted under 35 U.S.C. 154(b) by 36 days.

(21) Appl. No.: 18/612,167

(22) Filed: Mar. 21, 2024

(65) Prior Publication Data
US 2025/0299451 A1 Sep. 25, 2025

(51) Int. Cl.
| | |
|---|---|
| *G06T 19/20* | (2011.01) |
| *G06T 13/40* | (2011.01) |
| *G06T 19/00* | (2011.01) |
| *G06V 10/44* | (2022.01) |

(52) U.S. Cl.
CPC .............. *G06T 19/20* (2013.01); *G06T 13/40* (2013.01); *G06T 19/006* (2013.01); *G06V 10/44* (2022.01); *G06T 2219/2004* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 2014/0267313 A1* | 9/2014 | Marsella | ............... | G06T 13/205 |
| | | | | 345/474 |
| 2018/0095636 A1* | 4/2018 | Valdivia | .................. | G06F 3/011 |
| 2018/0158230 A1* | 6/2018 | Yan | ...................... | G06V 40/168 |

OTHER PUBLICATIONS

Mourot et al., "A Survey on Deep Learning for Skeleton-Based Human Animation" Published Nov. 21, 2021, Computer Graphics forum, vol. 41, pp. 122-157 (Year: 2021).*

* cited by examiner

*Primary Examiner* — Robert J Craddock
(74) *Attorney, Agent, or Firm* — Dority & Manning, P.A.

(57) ABSTRACT

Provided are methods, systems, devices, apparatuses, and tangible non-transitory computer readable media for generating avatars in a virtual environment. The disclosed technology can detect a plurality of inputs to control an avatar that is represented in a virtual environment. Based on one or more states of the virtual environment that are modified by the plurality of inputs, an interactive context associated with one or more states of the avatar in the virtual environment can be determined. Based on the one or more states of the virtual environment and the interactive context, a plurality of traits associated with a representation of the avatar in the virtual environment can be generated. Based on the plurality of traits, one or more modifications to the one or more states of the avatar can be generated. The one or more modifications can comprise modifying a visual representation of the avatar in the virtual environment.

20 Claims, 10 Drawing Sheets

200

210

202

ONE OR MORE MEMORY DEVICES

204

TRAIT DATA

206

INTERACTIVE CONTEXT DATA

ONE OR MORE
INTERCONNECTS

ONE OR
MORE
PROCESSORS        220

NETWORK
INTERFACE        222

MASS
STORAGE
DEVICES        224

OUTPUT
DEVICES        226

ONE OR
MORE
SENSORS        228

INPUT
DEVICES        230

ONE OR
MORE
LOCATION
DEVICES        232

702

712

710

720

704

714

706

716

708

718

900

DETECT A PLURALITY OF INPUTS 902

DETERMINE AN INTERACTIVE CONTEXT 904

GENERATE A PLURALITY OF TRAITS 906

GENERATE ONE OR MORE MODIFICATIONS TO ONE OR MORE STATES OF AN AVATAR 908

GENERATE ONE OR MORE MODIFICATIONS TO ONE OR MORE STATES OF A VIRTUAL ENVIRONMENT 910

Figure 10:
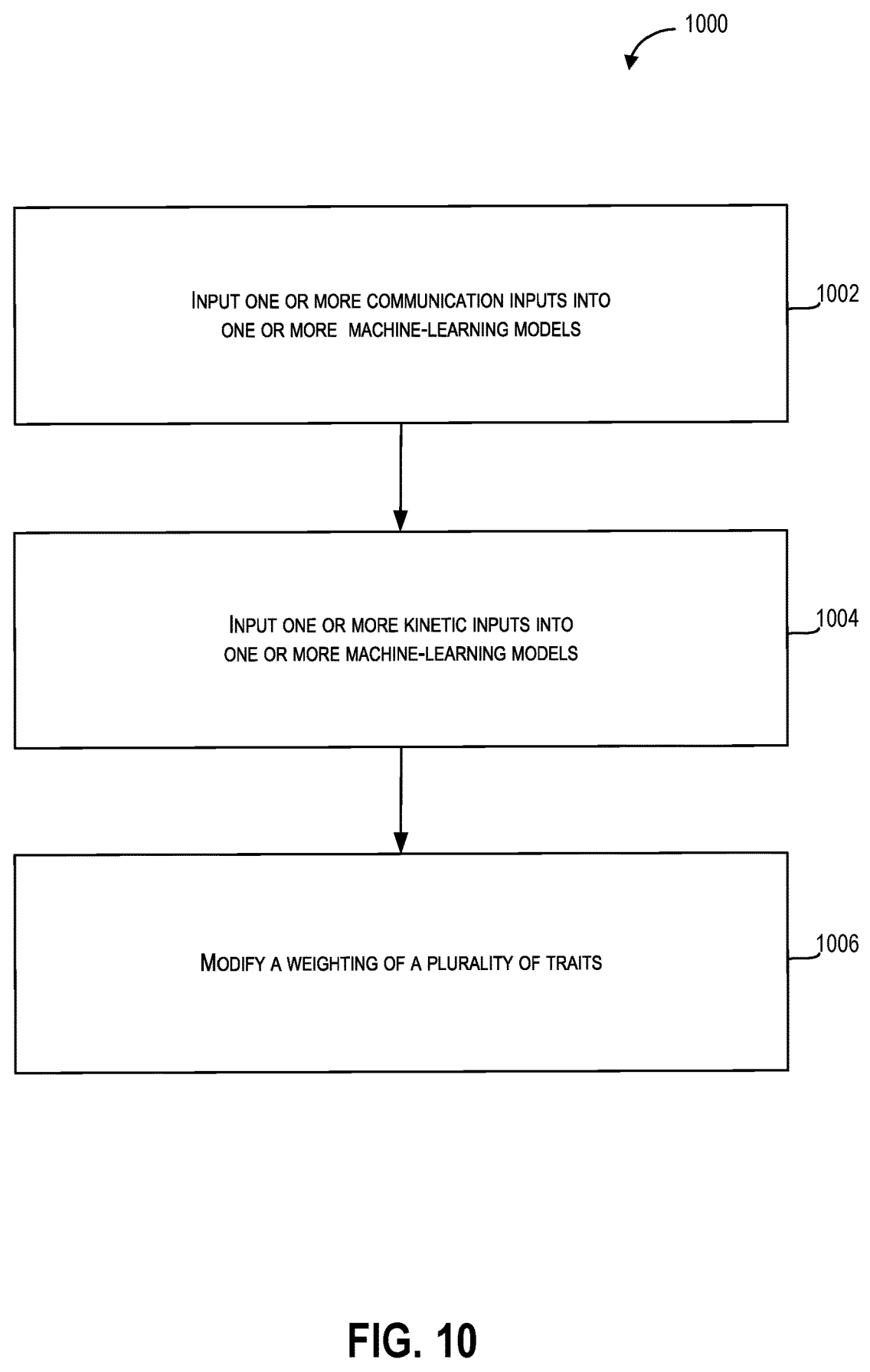

1000

INPUT ONE OR MORE COMMUNICATION INPUTS INTO
ONE OR MORE MACHINE-LEARNING MODELS

1002

INPUT ONE OR MORE KINETIC INPUTS INTO
ONE OR MORE MACHINE-LEARNING MODELS

1004

MODIFY A WEIGHTING OF A PLURALITY OF TRAITS

GENERATION AND MODIFICATION OF TRAIT BASED AVATARS

FIELD

The present disclosure generally relates to generating and modifying avatars that can be used in virtual environments. More particularly, the present disclosure relates to generating metadata and traits associated with avatars based on the analysis and processing of detected inputs.

BACKGROUND

Operations associated with generating virtual representations can be implemented on a variety of computing devices. These operations can comprise accessing data that indicates the state of virtual objects that can be represented within a virtual setting. Further, the operations can change the state of the virtual objects and cause the virtual objects to perform a variety of different actions. However, the operations performed on the virtual objects can vary over time, as can the states associated with the virtual objects. Accordingly, there can be different representations of virtual objects and different implementations can be used to present the virtual objects to users of a virtual setting.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of generating avatars. The computer-implemented method can comprise detecting, by a computing system comprising one or more processors, a plurality of inputs to control an avatar that is represented in a virtual environment. The computer-implemented method can comprise determining, by the computing system, based on one or more states of the virtual environment that are modified by the plurality of inputs, an interactive context associated with one or more states of the avatar in the virtual environment. The computer-implemented method can comprise generating, by the computing system, based on the one or more states of the virtual environment and the interactive context, a plurality of traits associated with a representation of the avatar in the virtual environment. Furthermore, the computer-implemented method can comprise generating, by the computing system, based on the plurality of traits, one or more modifications to the one or more states of the avatar. The one or more modifications can comprise modifying a visual representation of the avatar in the virtual environment.

Another example aspect of the present disclosure is directed to one or more tangible non-transitory computer-readable media storing computer-readable instructions that when executed by one or more processors cause the one or more processors to perform operations. The operations can comprise detecting a plurality of inputs to control an avatar that is represented in a virtual environment. The operations can comprise determining, based on one or more states of the virtual environment that are modified by the plurality of inputs, an interactive context associated with one or more states of the avatar in the virtual environment. The operations can comprise generating, based on the one or more states of the virtual environment and the interactive context, a plurality of traits associated with a representation of the avatar in the virtual environment. Furthermore, the operations can comprise generating, based on the plurality of traits, one or more modifications to the one or more states of the avatar. The one or more modifications can comprise modifying a visual representation of the avatar in the virtual environment.

Another example aspect of the present disclosure is directed to a computing system including: one or more processors; and one or more non-transitory computer-readable media storing instructions that when executed by the one or more processors cause the one or more processors to perform operations. The operations can comprise detecting a plurality of inputs to control an avatar that is represented in a virtual environment. The operations can comprise determining, based on one or more states of the virtual environment that are modified by the plurality of inputs, an interactive context associated with one or more states of the avatar in the virtual environment. The operations can comprise generating, based on the one or more states of the virtual environment and the interactive context, a plurality of traits associated with a representation of the avatar in the virtual environment. Furthermore, the operations can comprise generating, based on the plurality of traits, one or more modifications to the one or more states of the avatar. The one or more modifications can comprise modifying a visual representation of the avatar in the virtual environment.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 10 depicts a flow diagram of an example method of generating traits for avatars in a virtual environment according to example embodiments of the present disclosure.

Figure 1:
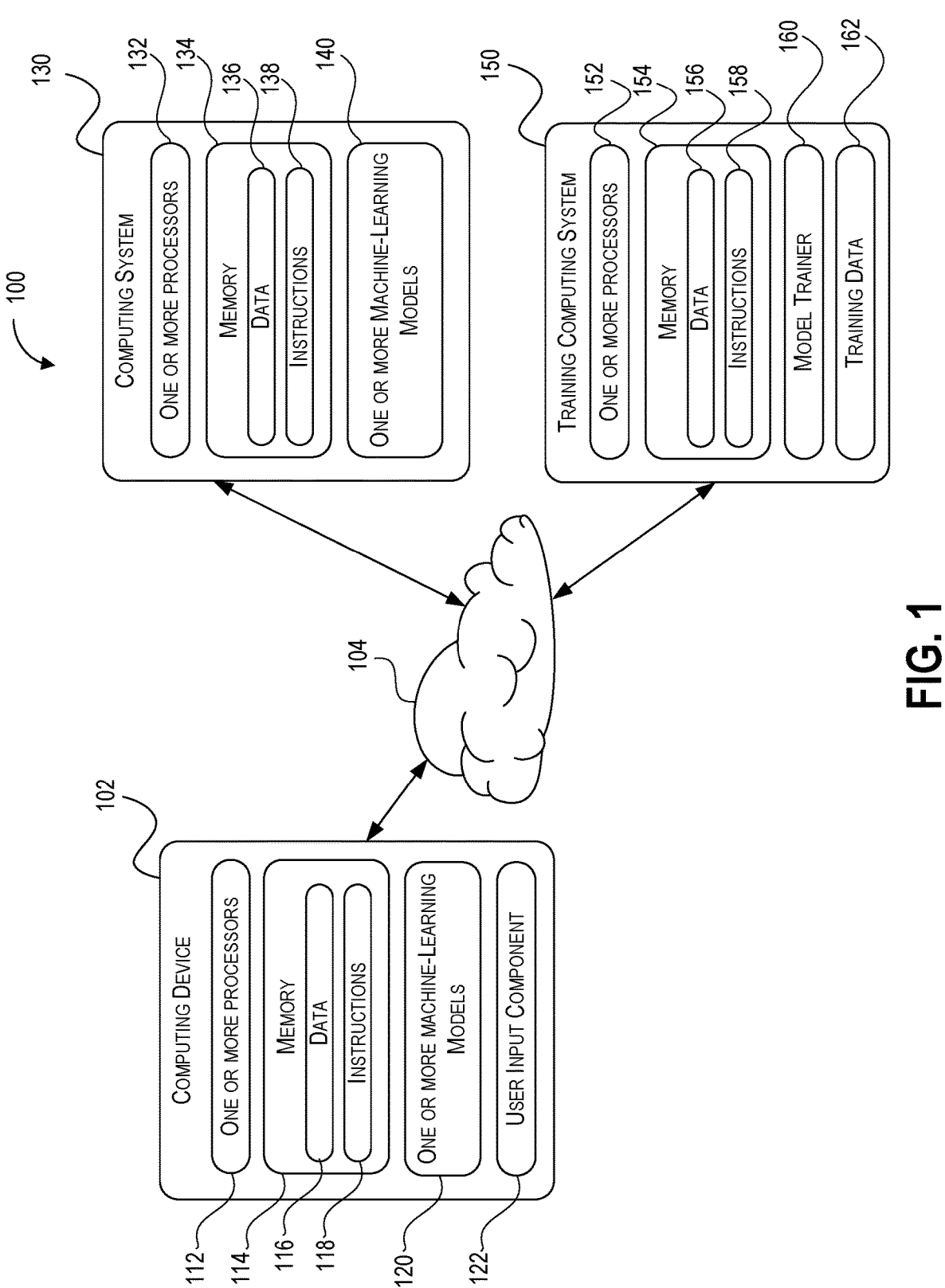
FIG. 1 depicts a diagram of an example system according to example embodiments of the present disclosure.

Reference numerals that are repeated across plural figures are intended to identify the same features in various implementations.

DETAILED DESCRIPTION

Generally, the present disclosure is directed to the generation of avatars that can be used in a virtual environment. In particular, the disclosed technology is directed to a computing system that can detect inputs (e.g., user inputs to control an avatar and/or user generated content including status posts and/or sent messages) and generate or modify traits that can be used to modify the state of an avatar in a virtual environment. Further, the disclosed technology can leverage the use of machine-learning models that can be configured and/or trained to generate and/or modify an avatar's traits based on the analysis and processing of the inputs that are used to control the avatar in the virtual environment.

For example, a user can use an application that is executed on a computing system of the disclosed technology to control an avatar in a virtual environment. The avatar can comprise a representation (e.g., visual representation and/or aural representation) that can be controlled based on the plurality of inputs and used to interact with objects in the virtual environment. Further, the computing system can be configured to detect a plurality of inputs that the user uses to control the avatar in the virtual environment. For example, the computing system can be configured to detect keyboard inputs and gamepad inputs that a user uses to control movement of the avatar in the virtual environment. The virtual environment can comprise a representation of some combination of a synthetic environment (e.g., a three-dimensional environment that is rendered on a display device) and/or real-world environment (e.g., the real-world surroundings of a user that can be detected by sensors and rendered on a display device). By way of example, a virtual environment can comprise a virtual meeting place (e.g., a virtual conference room), a virtual educational place (e.g., a virtual class room or a virtual lecture hall), a virtual sporting arena (e.g., a virtual hockey arena or basketball arena), a virtual race course (e.g., a virtual auto racing track, foot racing track, or rowing course), a virtual fantasy environment (e.g., a virtual environment based on a fantasy book or science-fiction movie), and/or a virtual representation of a real-world location (e.g., the Hermitage in Saint Petersburg or the Grand Canyon in Arizona).

Further, the virtual environment can be configured to display objects (e.g., three-dimensional models of objects) that can be used and/or interacted with via the plurality of inputs. For example, inputs can be used to move an avatar from one location in the virtual environment to another location in the virtual environment. The inputs can also be used to cause the avatar to interact with (e.g., pick up or move) objects in the virtual environment. Additionally, user inputs can comprise communication with other entities (e.g., other avatars) that are represented in the virtual environment. For example, a user can use text chat and/or voice chat to communicate with other avatars.

Based on one or more states of the virtual environment that are modified by the plurality of inputs, an interactive context associated with one or more states of the avatar in the virtual environment can be determined. For example, if an avatar in a virtual environment is communicating with another avatar using text, the interactive context can comprise a communication context. Further, if an avatar in a virtual environment contacts another avatar by bumping into the other avatar, the interactive context can comprise a kinetic context. Based on the one or more states of the virtual environment and the interactive context, a plurality of traits associated with a representation of the avatar in the virtual environment can be generated. For example, in a virtual environment in which an avatar communicates in an aggressive manner (e.g., using aggressive language) with other avatars, traits associated with aggressiveness can be modified to indicate that the avatar is more aggressive. Further, in a virtual environment in which an avatar avoids contact with other avatars, traits associated with introversion can be modified to indicate that the avatar is more introverted.

Based on the plurality of traits, one or more modifications to the one or more states of the avatar can be generated. For example, traits that indicate greater aggressiveness can be used to modify one or more states of the avatar including making the visual representation of the avatar more aggressive (e.g., the avatars facial expression can be more aggressive or an avatar may wear aggressive looking garb). By way of further example, traits that indicate greater aggressiveness can be used to modify one or more features of the avatar including kinetic features that make the kinetic representation of the avatar more aggressive (e.g., the avatars stance or gestures can be more aggressive).

The disclosed technology can leverage the generation of traits to improve the generation and/or modification of avatars in virtual environments. By way of example, the disclosed technology can use one or more devices operated by a user (e.g., a user operating a computing device such as a smartphone, a laptop computing device, and/or an extended reality device) to detect user inputs to control an avatar in a virtual environment. A combination of the use of one or more machine-learning models and/or rules-based processing can be used to detect the inputs and generate traits that can be used to modify the state of the avatar and/or the virtual environment. As such, the disclosed technology enhances and facilitates a user's interaction with a virtual environment by using detected inputs to modify an avatar in the virtual environment.

Accordingly, the disclosed technology can improve the user experience by generating avatars based on traits associated with user inputs. Further, different traits can cause an avatar to interact differently with other avatars (e.g., artificial intelligence (AI) based avatars and/or avatars controlled by other users). In particular, the interactions of an AI based avatar with another avatar can be based on the other avatar's traits and be different from the interactions of the same AI based avatar with another avatar that has different traits. The disclosed technology can assist a user in more effectively performing the technical task of controlling and modifying avatars in a virtual environment by means of a continued and/or guided human-machine interaction process in which the disclosed technology automatically modifies representations of an avatar in real-time based on detected user inputs.

In some embodiments, the disclosed technology can comprise a computing system (e.g., a virtual environment computing system) that can comprise one or more computing devices (e.g., devices with one or more computer processors and a memory that can store one or more instructions) that can send, receive, process, generate, and/or modify data (e.g., data associated with one or more states of an avatar and/or a virtual environment). The data and/or one or more signals can be communicated (e.g., sent and/or received) by the computing system with various other systems and/or devices (e.g., one or more remote computing systems, one or more remote computing devices, and/or one or more software applications operating on one or more computing devices) that can send and/or receive data that indicates the state of an avatar and/or a virtual environment. In some embodiments, the computing system (e.g., the virtual environment computing system) can comprise one or more features of the device 102 that is described with respect to FIG. 1 and/or the computing device 200 that is described with respect to FIG. 2. Further, the virtual environment computing system can be associated with one or more machine-learning models that include one or more features of the one or more machine-learning models 120 that are described with respect to FIG. 1

Furthermore, the computing system can comprise specialized hardware (e.g., an application specific integrated circuit) and/or software that enables the computing system to perform one or more operations specific to the disclosed technology including detecting a plurality of inputs to control an avatar that is represented in a virtual environment, determining an interactive context associated with one or more states of the avatar in the virtual environment, generating a plurality of traits associated with a representation of the avatar in the virtual environment, and generating one or more modifications of the one or more states of the avatar.

The computing system can detect a plurality of inputs to control an avatar that is represented in a virtual environment. For example, the virtual environment computing system can comprise one or more input devices (e.g., a keyboard, mouse, stylus, touch screen, extended reality device, microphone, joystick, and/or gamepad) that are configured to detect inputs from a user. In some embodiments, the one or more input devices can comprise an extended reality device (e.g., an extended reality headset) that can comprise output devices (e.g., display devices and audio speakers) and sensors (e.g., one or more cameras, one or more LiDAR devices, and/or one or more microphones) that are configured to detect the position and/or motion of a user.

In some embodiments, the virtual environment can comprise an extended reality environment (e.g., an augmented reality environment, a virtual reality environment, or a mixed reality environment) that can be based on one or more real-world states. For example, an extended reality device (e.g., an extended reality headset) can comprise sensors (e.g., cameras, LiDAR, and/or microphones) that can detect one or more real-world states of a real-world environment around the extended reality device (e.g., the physical environment that can be detected by the extended reality device). The extended reality device can use the detected one or more real-world states to render some portion of a virtual environment. The virtual environment can then be presented to a user and can comprise a combination of representations that are based on one or more real-world states (e.g., a table or chair that are detected by the extended reality device) and/or one or more virtual states (e.g., one or more virtual objects) that are not based on the one or more real-world states.

Further, the one or more inputs can comprise inputs associated with one or more real-world objects associated with the one or more real-world states. For example, an extended reality device may render a virtual ball (e.g., a virtual tennis ball) that can be configured to move based on user inputs (e.g., a user's hand moving to an area in the real-world that is occupied by the virtual ball in the same location in a virtual environment that is based on the real-world). A user's hand swatting the virtual ball may cause the virtual ball to move in the virtual environment in a way that is similar to the way an actual ball of similar size and shape would move in the real world in response to being swatted by the user's hand.

The computing system can determine, based on one or more states of the virtual environment that are modified by the plurality of inputs, an interactive context associated with one or more states of the avatar in the virtual environment. For example, the plurality of inputs can be used to cause an avatar to perform certain types of actions in the virtual environment (e.g., interactions with objects in the virtual environment and/or interactions with other avatars in the virtual environment).

The interactive contexts associated with actions in the virtual environment can comprise communication contexts (e.g., contexts such as chat windows in which inputs to communicate with other avatars are provided), control contexts (e.g., contexts in which inputs are used to control an interaction of an avatar with some object in the virtual environment), configuration contexts (e.g., contexts in which inputs are used to change the configuration of an avatar including the appearance of the avatar), and/or environmental contexts (e.g., contexts in which one or more states of the virtual environment can determine the types of actions that an avatar can perform). For example, if a chat window or spoken voice inputs are used to communicate with other avatars, the inputs can be determined to be associated with a communication context. If an input from a gamepad is used to move an avatar into a different section of a virtual environment, the input can be determined to be associated with a control context. If an input from a keyboard is used to change the appearance of an avatar (e.g., change the color of an avatar's clothing), the input can be determined to be associated with a configuration context. If an avatar is within a section of a virtual environment in which the avatar may interact with the virtual environment in a particular way (e.g., in a simulated water section of a virtual environment, an avatar may swim instead of walking), the inputs can be determined to be associated with an environmental context.

The computing system can generate, based on the one or more states of the virtual environment and the interactive context, a plurality of traits associated with a representation of the avatar in the virtual environment. For example, the one or more states of the virtual environment can comprise an avatar communicating with another avatar via a voice chat. The one or more states of an avatar can comprise the avatar's location (e.g., a virtual store in the virtual environment), a configuration of the avatar (e.g., a current appearance of the avatar in the virtual environment), and/or one or more types of action the avatar is capable of performing in the virtual environment. The one or more states of the virtual environment and interactive context can be used to determine the plurality of traits that are associated with the avatar. For example, if an avatar is associated with a communication context and a user generates text inputs that are used to communicate with another avatar in a humorous manner (e.g., telling jokes or making a humorous double entendre), traits associated with humor can be generated and/or modified.

Generation and/or modification of the plurality of traits can be based on the use of one or more machine-learning models that can be configured to receive input comprising the plurality of inputs, one or more states of the avatar, one or more states of the virtual environment, and/or one or more interactive contexts. Further, the one or more machine-learning models can be configured to process and/or evaluate the input in order to generate output comprising a plurality of traits associated based on the input.

In some embodiments, the plurality of inputs can comprise one or more communication inputs. The one or more communication inputs can comprise inputs in which a user communicates in the virtual environment. The one or more communication inputs can comprise one and/or more text inputs and/or one or more spoken inputs. Further, generating a plurality of traits associated with a representation of the avatar in the virtual environment can comprise the use of one or more machine-learning models. For example, the plurality of inputs can be inputted into a machine-learning model that is configured to generate the plurality of traits based on the communication inputs.

By way of further example, the one or more machine-learning models can comprise one or more natural language processing models that can be configured to determine the meaning of text and/or spoken speech that is inputted in the one or more machine-learning models. The one or more machine-learning models may then generate and/or modify traits that can be associated with the text that was inputted. For example, if one or more machine-learning models detected aggressive language in the text and/or spoken speech that was inputted into the one or more machine-learning models then traits associated with aggressiveness can be generated and/or modified.

In some embodiments, the plurality of inputs can comprise one or more kinetic inputs to control movement of the avatar in the virtual environment. For example, the one or more kinetic inputs can comprise one or more inputs that control the direction in which an avatar moves, a speed at which an avatar moves, and/or an action (e.g., running, walking, jumping, swimming, crouching, catching, holding, and/or throwing) that is performed by an avatar. Further, generating a plurality of traits associated with a representation of the avatar in the virtual environment can comprise inputting the plurality of inputs into a machine-learning model that is configured to generate the plurality of traits based on the one or more kinetic inputs. For example, a high frequency of an avatar running relative to an avatar walking may result in the generation and/or modification of traits associated with the speed at which an avatar moves. As such, a high frequency of causing an avatar to run may increase traits associated with avatar speed, which may in turn result in a faster speed of movement of an avatar.

Further, the one or more machine-learning models can comprise one or more movement interpretation models that can be configured to classify inputs that control movement of an avatar. For example, one or more machine-learning models may receive a plurality of inputs (e.g., inputs from a keyboard, mouse, stylus, touch screen, extended reality device, microphone, joystick, and/or gamepad) that direct an avatar away from other avatars and/or moving objects in the virtual environment. Based on the plurality of inputs that are inputted into the one or more machine-learning models, the one or more machine-learning models may then generate and/or modify contact avoidant traits based on the classified movements of the avatar.

In some embodiments, generating the plurality of traits associated with the representation of the avatar in the virtual environment can comprise modifying a weighting of the plurality of traits based on the one or more states of the virtual environment and/or the interactive context. For example, if one or more states of the virtual environment indicate that the avatar is located within a race track and the interactive context indicates that the avatar is participating in a virtual race, a weighting of the plurality of traits associated with participating in the virtual race (e.g., reflexes, agility, and/or speed) can be modified.

The weighting of traits that are determined to be more associated with the plurality of inputs can be weighted more heavily than the traits that are determined to be less associated with the plurality of inputs can be weighted more heavily. For example, a trait associated with humor can be weighted more heavily if the plurality of inputs frequently comprises communications that include jokes or other humorous content.

Further, the weighting of the plurality of traits can be positively correlated with an extent to which the plurality of traits modify the visual representation of avatar. For example, if a physical strength trait is heavily weighted then the visual representation of an avatar can comprise a stronger looking (e.g., larger and more muscular) avatar than if the physical strength trait had a low weighting in which case the visual representation of the avatar may appear smaller and less muscular.

Generation and/or modification of the plurality of traits can be based on the use of one or more rules (e.g., one or more predetermined rules) that may generate and/or modify traits based on processing the plurality of inputs, one or more states of the avatar, one or more states of the virtual environment, and/or one or more interactive contexts. The one or more rules can comprise one or more conditions that, when satisfied, result in the generation and/or modification of traits. For example, the one or more rules can comprise a threshold number of times that an avatar performs actions in some time interval. If the avatar performs greater than the threshold number of actions in the time interval, then an associated trait can be generated and/or modified. For example, if inputs that cause an avatar to move in a particular direction exceed a threshold number of movements per hour, a trait associated with a favored side of the avatar can be modified and/or generated. The trait associated with the favored side of the avatar can be visually represented on the avatar by the avatar's handedness (e.g., the dominant hand used by a human shaped avatar to hold items).

Further, the one or more rules can comprise the use of one or more key words that, when detected, can result in the generation and/or modification of traits. For example, one or more key words can comprise key words associated with certain types of traits. If the avatar's communications comprise the key words, then an associated trait can be generated and/or modified. For example, if text-based inputs comprise words associated with enthusiasm for a particular sports team, a trait associated with enthusiasm for that particular sports team can be generated and/or modified. The trait associated with the enthusiasm for a particular sports team can be visually represented on the avatar by modifying a visual representation of an avatar to include the name of the sports team, a logo of the sports team, and/or insignia or other visual aspects associated with the sports team (e.g., team colors).

The computing system can generate, based on the plurality of traits, one or more modifications to the one or more states of the avatar. The one or more modifications can comprise modifying a visual representation of the avatar in the virtual environment. For example, traits associated with a particular profession may result in modifying a visual representation of the avatar such that an appearance of an avatar (e.g., clothing worn by an avatar or implements held by an avatar) matches the visual representation associated with the profession (e.g., a lawyerly trait can be visually represented by a suit and tie worn that is rendered on the avatar and/or a scientific researcher can be visually represented by a white lab coat that is rendered on the avatar).

In some embodiments, the computing system can, based on the plurality of traits, generate one or more modifications to the one or more states of the virtual environment. The one or more modifications can comprise modifying a visual representation of the virtual environment that is presented to a user. For example, if a large portion (e.g., a majority or plurality) of traits are classified as cheerful and optimistic, a visual representation of the virtual environment can be rendered as more cheerful and optimistic (e.g., bright colors, clear blue skies, and rainbows). If a significant portion (e.g., a majority or plurality) of traits are classified as gloomy or pessimistic, a visual representation of the virtual environment that is visually more gloomy and pessimistic (e.g., dark and subdued colors, grey cloudy skies, and rain) can be generated.

In some embodiments, the one or more states of the avatar can be based on one or more aural features of the avatar. The one or more aural features can comprise one or more sounds that are associated with the avatar. The one or more sounds can be persistent sounds (e.g., music or sound effects that are generated persistently) or non-persistent (e.g., music or sound effects that are not generated persistently). Persistent sounds can comprise ambient music that plays whenever an avatar is in a virtual environment. Non-persistent sounds can comprise sounds that can be based on an avatar performing some action (e.g., an input that causes an avatar to move in the virtual environment can cause the generation of sounds associated with movement such as the sound of footsteps). In some embodiments, the one or more aural features can comprise sound effects associated with the avatar. For example, when an avatar performs one or more actions and/or is in some location in a virtual environment, a sound effect such as the sound of a chime or cymbal can be generated.

Further, the one or more modifications can comprise modifying the one or more aural features of the avatar. For example, the one or more modifications can comprise modifying a volume of the one or more aural features (e.g., making an aural feature louder if a particular trait is weighted more heavily or making the aural feature quieter if the trait is weighted less heavily) and/or changing the frequency with which the one or more aural features are generated in the virtual environment (e.g., increasing the frequency of generating an aural feature if a particular trait is weighted more heavily or reducing the frequency of generating the aural feature if the trait is weighted less heavily). Further, the one or more aural features can be modified by associating the one or more aural features with one or more states of the avatar. For example, an aural feature (e.g., an avatar whistling) can be associated with one or more states in which an avatar does not receive an input (e.g., a user input) for greater than a threshold amount of time.

In some embodiments, the one or more states of an avatar can be based on one or more kinetic features of the avatar. The one or more kinetic features can comprise one or more movements or gestures that are associated with the avatar. The one or more movements or gestures can be persistent movements or gestures (e.g., movements or gestures of the avatar that are generated persistently) or non-persistent (e.g., movements or gestures that are not generated persistently). For example, persistent movements or gestures can comprise movements such as an avatar's chest rising and falling to breathe whenever an avatar is in a virtual environment. Non-persistent movements or gestures can comprise movements or gestures that are based on an avatar performing some action (e.g., an input that causes an avatar to move in the virtual environment can cause the generation of movements or gestures associated with movement such as an avatar raising its arms). Further, the one or more kinetic features can comprise a movement speed of the avatar (e.g., a speed at which an avatar moves in a virtual environment in response to inputs from a user), an acceleration of the avatar (e.g., an acceleration of an avatar in a virtual environment in response to inputs from a user), one or more expressions of the avatar (e.g., one or more facial expressions of an avatar), one or more postures of the avatar (e.g., a way an avatar stands or sits), and/or one or more gestures of the avatar (e.g., snapping fingers, clapping, or waving).

Further, the one or more modifications can comprise modifying the one or more kinetic features of the avatar. For example, the one or more modifications can comprise modifying a movement speed or acceleration of the one or more kinetic features (e.g., making an avatar move more speedily or accelerate at a higher rate if a particular trait is weighted more heavily or making an avatar move more slowly or accelerate at a lower rate if the trait is weighted less heavily) and/or changing the frequency with which the one or more kinetic features are generated in the virtual environment (e.g., increasing the frequency of generating an kinetic feature if a particular trait is weighted more heavily or reducing the frequency of generating the kinetic feature if the trait is weighted less heavily). Further, the one or more kinetic features can be modified by associating the one or more kinetic features with one or more states of the avatar. For example, a kinetic feature (e.g., an avatar making a particular gesture such as sitting down) can be associated with one or more states in which an avatar does not receive an input (e.g., a user input) for greater than a threshold amount of time.

In some embodiments, the one or more states of the avatar can be based on a mesh model (e.g., a two-dimensional mesh or three-dimensional mesh) of the avatar. For example, the shape of an avatar can be based on a three-dimensional mesh (e.g., a polygonal mesh that can comprise vertices, edges, and faces) of the avatar. The mesh model of the avatar can be configured to me controlled based on the plurality of inputs and can be represented as an animated entity in a virtual environment.

Further, the one or more modifications can comprise modifying the shape and/or size of a three-dimensional mesh of an avatar. For example, a portion of the three-dimensional mesh of the avatar can be associated with clothing worn by the avatar. The one or more modifications can comprise modifying a shape and/or size of the three-dimensional mesh associated with the clothing (e.g., a dress shirt can be modified to appear like a t-shirt or sweater).

In some embodiments, the one or more states of the avatar can be based on a plurality of textures that are mapped to a three-dimensional mesh of the avatar. For example, an avatar that is based on a three-dimensional mesh (e.g., a wire-frame model of the avatar) can comprise a plurality of surfaces that can be filled with some texture (e.g., a solid color, a pattern, and/or an image). Further, the one or more modifications can comprise modifying the plurality of textures. The one or more modifications can comprise changing the textures that are associated with portions of the three-dimensional mesh of the avatar. For example, a portion of the three-dimensional mesh of the avatar can be associated with hair on the head of the avatar. The one or more modifications can comprise modifying a color of the texture associated with the hair and/or the pattern associated with the hair (e.g., a pattern that simulates the appearance of straight hair, curly hair, or wavy hair).

The systems, methods, devices, apparatuses, and tangible non-transitory computer-readable media in the disclosed technology can provide a variety of technical effects and benefits including improving the generation of avatars for use in virtual environments. In particular, the disclosed technology may assist a user (e.g., a user of an application that controls an avatar in a virtual environment) in performing a technical task (e.g., controlling an avatar in a virtual environment) by means of a continued and/or guided human-machine interaction process. It may also provide benefits including facilitating communication in a virtual environment, improving the efficiency of modifying avatars in a virtual environment, and/or reducing inefficiencies in communications networks.

The disclosed technology can facilitate communications in a virtual environment. For example, the disclosed technology can automatically modify the appearance of an avatar so that the appearance of the avatar more effectively communicates the avatar's state to other users of the virtual environment. For example, by modifying the visual representation of an avatar to be more welcoming (e.g., an avatar with bright colorful clothing and a smiling expression) may signal to other users that the avatar is open to conversation.

Additionally, without the use of the disclosed technology a significant amount of time can be spent modifying and/or generating an avatar that more accurately reflects the personality and preferences of a user. Using the disclosed technology, the state of an avatar can be automatically generated and/or modified in real-time with little or no user intervention. By detecting inputs of a user and generating and/or modifying traits and associated features of an avatar, the disclosed technology can significantly reduce the amount of manual configuration performed by a user.

Furthermore, the disclosed technology can improve the efficacy with which communications network operate by reducing the number of extraneous communications to modify avatars. Under some circumstances, a user may manually configure an avatar to reflect the user's particular interests and personality. The disclosed technology can modify an avatar by automatically generated traits that are based on automatically detected inputs in which a user controls the avatar in the virtual environment. As such, the inefficiencies that can result from excessive or wasteful use of network bandwidth can be reduced.

Accordingly, the disclosed technology may improve the effectiveness with which avatars are generated in a virtual environment, thereby allowing a computing device to perform more efficiently/effectively the technical task of detecting inputs and controlling objects in a virtual environment by means of a continued and/or guided human-machine interaction process. In addition, the disclosed technology may provide a computing system that facilitates more effective detection of inputs and generation of traits that are used to modify virtual objects in a virtual environment. The disclosed technology provides the specific benefits of improved generation of representations of avatars in virtual environments, which can be used to improve the effectiveness of a wide variety of services including online collaboration services, gaming services, online meeting services, and/or educational services.

With reference now to FIGS. 1-10, example embodiments of the present disclosure will be discussed in further detail. FIG. 1 depicts a diagram of an example system according to example embodiments of the present disclosure. The system 100 can comprise a computing device 102, a server computing system 130, and a training computing system 150 that are communicatively connected and/or coupled over a network 104.

The computing device 102 can comprise any type of computing device, including, for example, an extended reality computing device (e.g., a computing device that can be used to implement virtual reality, augmented reality, and/or mixed reality), a personal computing device (e.g., a laptop computing device or a desktop computing device), a mobile computing device (e.g., smartphone or tablet), a gaming console, a controller, a wearable computing device (e.g., a smart watch), an embedded computing device, and/or any other type of computing device.

The computing device 102 can comprise one or more processors 112 and one or more memory devices 114. The one or more processors 112 can comprise any suitable processing device (e.g., a processor core, a microprocessor, an ASIC, a FPGA, a controller, a microcontroller, etc.) and can comprise one processor or a plurality of processors that are operatively connected. The one or more memory devices 114 can comprise one or more non-transitory computer-readable storage mediums, including RAM, ROM, EEPROM, EPROM, solid state drives (SSDs), and/or hard disk drives (HDDs). The one or more memory devices 114 can be configured to store the data 116 and/or the instructions 118 which can be executed by the processor 112 to cause the computing device 102 to perform operations.

In some embodiments, the computing device 102 can perform one or more operations including detecting a plurality of inputs to control an avatar that is represented in a virtual environment, determining an interactive context associated with one or more states of the avatar, generating a plurality of traits associated with a representation of the avatar, and/or generating one or more modifications to the one or more states of the avatar (e.g., modifications of a visual representation of the avatar) in the virtual environment.

In some implementations, the computing device 102 can store and/or implement include one or more machine-learning models including the one or more machine-learning models 120. For example, the one or more machine-learning models 120 can comprise various machine-learning models based on various types of machine-learning frameworks including neural networks (e.g., deep neural networks), generative adversarial networks, and/or other types of machine-learning frameworks that can comprise non-linear models and/or linear models. Neural networks can comprise feed-forward neural networks, recurrent neural networks (e.g., long short-term memory recurrent neural networks), convolutional neural networks or other forms of neural networks. Examples of the one or more machine-learning models 120 are described herein.

In some implementations, the one or more machine-learning models 120 can be received from the server computing system 130 over network 104, stored in the one or more memory devices 114, and can be used or otherwise implemented by the one or more processors 112. In some implementations, the computing device 102 can implement multiple parallel instances of a single machine-learning model of the one or more machine-learning models 120 (e.g., to perform parallel trait generation operations across multiple instances of the machine-learning model 120). More particularly, the one or more machine-learning models 120 can generate and/or modify a plurality of traits based in part on various inputs including a plurality of inputs, one or more states of an avatar, one or more states of a virtual environment, and/or an interactive context. Further, the one or more machine-learning models 120 can generate one or more modifications of a visual representation of an avatar.

Additionally or alternatively, one or more machine-learning models 140 can be included in or otherwise stored and implemented by the server computing system 130 that can communicate with the computing device 102. For example, the machine-learning models 140 can be implemented by the server computing system 130 as a portion of a web service (e.g., a virtual environment service). Thus, one or more machine-learning models 120 can be stored and implemented at the computing device 102 and/or one or more machine-learning models 140 can be stored and implemented by the server computing system 130.

The computing device 102 can also include one or more of the user input components 122 that can be configured to receive one or more user inputs. For example, the one or more user input components 122 can comprise a keyboard, mouse, and/or a touch-sensitive component (e.g., a touch-sensitive display). Other examples of the one or more user input components include a microphone, stylus, or other devices a user can use to provide user input.

The server computing system 130 can comprise one or more processors 132 and one or more memory devices 134. The one or more processors 132 can comprise any suitable processing device (e.g., a processor core, a microprocessor, an ASIC, a FPGA, a controller, a microcontroller, etc.) and can comprise one processor or a plurality of processors that are operatively connected. The one or more memory devices 134 can comprise one or more non-transitory computer-readable storage mediums, including RAM, ROM, EEPROM, EPROM, solid state drives (SSDs), and/or hard disk drives (HDDs). The one or more memory devices 134 can be configured to store the data 136 and/or instructions 138 which can be executed by the processor 132 to cause the server computing system 130 to perform operations.

In some embodiments, the server computing system 130 can perform one or more operations including detecting a plurality of inputs to control an avatar that is represented in a virtual environment, determining an interactive context associated with one or more states of the avatar, generating a plurality of traits associated with a representation of the avatar, and/or generating one or more modifications to the one or more states of the avatar (e.g., modifications of a visual representation of the avatar) in the virtual environment.

Furthermore, the server computing system 130 can perform analysis of one or more inputs (e.g., one or more control inputs used to control an avatar in a virtual environment) that are provided to the server computing system 130. For example, the server computing system 130 can receive data, via the network 104, including data associated with a plurality of inputs, one or more states of the avatar, one or more states of the virtual environment, and/or one or more interactive contexts. The server computing system 130 can then perform various operations, which can comprise the use of the one or more machine-learning models 140, to detect, determine, modify, and/or generate one or more features of the plurality of inputs, one or more states of the avatar, one or more states of the virtual environment, and/or one or more interactive contexts. By way of further example, the server computing system 130 can detect and/or classify one or more inputs associated with a virtual environment (e.g., kinetic inputs, voice inputs, control inputs, and/or communication inputs) and generate trait information based on the detected inputs. In another example, the server computing system 130 can receive data from one or more remote computing systems (not shown) which can comprise data associated with the plurality of inputs, one or more states of the avatar, one or more states of the virtual environment, and/or one or more interactive contexts. The data received by the server computing system 130 can then be stored (e.g., stored in virtual environment repository) for later use by the server computing system 130.

In some implementations, the server computing system 130 can comprise or can be implemented by one or more server computing devices. In instances in which the server computing system 130 includes plural server computing devices, such server computing devices can operate according to various architectures which can comprise sequential computing architectures and/or parallel computing architectures.

As described above, the server computing system 130 can store or otherwise implement one or more machine-learning models 140. For example, the one or more machine-learning models 140 can comprise various machine-learning models. Example machine-learning models include neural networks or other multi-layer non-linear models. Example neural networks include feed forward neural networks, deep neural networks, recurrent neural networks, and convolutional neural networks. Examples of the one or more machine-learning models 140 are discussed with reference to FIGS. 1-10.

The computing device 102 and/or the server computing system 130 can train the one or more machine-learning models 120 and/or 140 via interaction with the training computing system 150 that can be communicatively connected and/or coupled over the network 104. The training computing system 150 can be separate from the server computing system 130 or can be a portion of the server computing system 130.

The training computing system 150 includes one or more processors 152 and one or more memory devices 154. The one or more processors 152 can be any suitable processing device (e.g., a processor core, a microprocessor, an ASIC, a FPGA, a controller, a microcontroller, etc.) and can be one processor or a plurality of processors that are operatively connected. The one or more memory devices 154 can comprise one or more non-transitory computer-readable storage mediums, including RAM, ROM, EEPROM, EPROM, solid state drives (SSDs), and/or hard disk drives (HDDs). The one or more memory devices 154 can be configured to store the data 156 and/or the instructions 158 which can be executed by the processor 152 to cause the training computing system 150 to perform operations. In some implementations, the training computing system 150 can comprise or is implemented by one or more server computing devices.

The training computing system 150 can comprise a model trainer 160 that is configured to train the one or more machine-learning models 120 and/or the one or more machine-learning models 140 respectively stored at the computing device 102 and/or the server computing system 130 using various training or machine-learning techniques. The training or machine-learning techniques can, for example, include backwards propagation of errors. In some implementations, performing backwards propagation of errors can comprise performing truncated backpropagation through time. The model trainer 160 can perform a number of generalization techniques (e.g., weight decays and/or dropouts) to improve the generalization capability of the models being configured and/or trained.

In particular, the model trainer 160 can train the one or more machine-learning models 120 and/or the one or more machine-learning models 140 based on a set of training data 162. The training data 162 can comprise, for example, data associated with the plurality of inputs, one or more states of the avatar, one or more states of the virtual environment, and/or one or more interactive contexts. For example, the training data can comprise actual avatars configured by users, synthetically generated avatars, interactive entities that are implemented in a virtual environment, virtual environments that have been implemented and/or recorded, chat logs from virtual environments, three-dimensional models of virtual objects in a virtual environment, and/or user feedback based on user interactions with a virtual environment.

In some implementations, if a user has provided consent, the training examples can be provided by the computing device 102. In such implementations, the one or more machine-learning models 120 provided to the computing device 102 can be configured and/or trained by the training computing system 150 on user-specific data received from the computing device 102.

The model trainer 160 can comprise computer logic that is used to perform the operations described herein. The model trainer 160 can be implemented in hardware, firmware, and/or software controlling a general-purpose processor. In some implementations, the model trainer 160 can comprise program files stored on a storage device that are loaded into a memory and executed by one or more processors. In other implementations, the model trainer 160 can comprise one or more sets of computer-executable instructions that can be stored in a tangible computer-readable storage medium including RAM hard disk, optical media, and/or magnetic media.

In some embodiments, the training computing system 150 can perform one or more operations including detecting a plurality of inputs to control an avatar that is represented in a virtual environment, determining an interactive context associated with one or more states of the avatar, generating a plurality of traits associated with a representation of the avatar, and/or generating one or more modifications to the one or more states of the avatar (e.g., modifications of a visual representation of the avatar) in the virtual environment.

The network 104 can comprise any type of communications network, including a local area network (e.g., intranet), wide area network (e.g., Internet), or some combination thereof and can comprise any number of wired or wireless links. In general, communication over the network 104 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, and/or SSL).

FIG. 1 illustrates one example computing system that can be used to implement the present disclosure. Other computing systems can be used as well. For example, in some implementations, the computing device 102 can comprise the model trainer 160 and the training data 162. In such implementations, the one or more machine-learning models 120 can be both trained and used locally at the computing device 102. In such implementations, the computing device 102 can implement the model trainer 160 to personalize the one or more machine-learning models 120 based on user-specific data.

Figure 2:
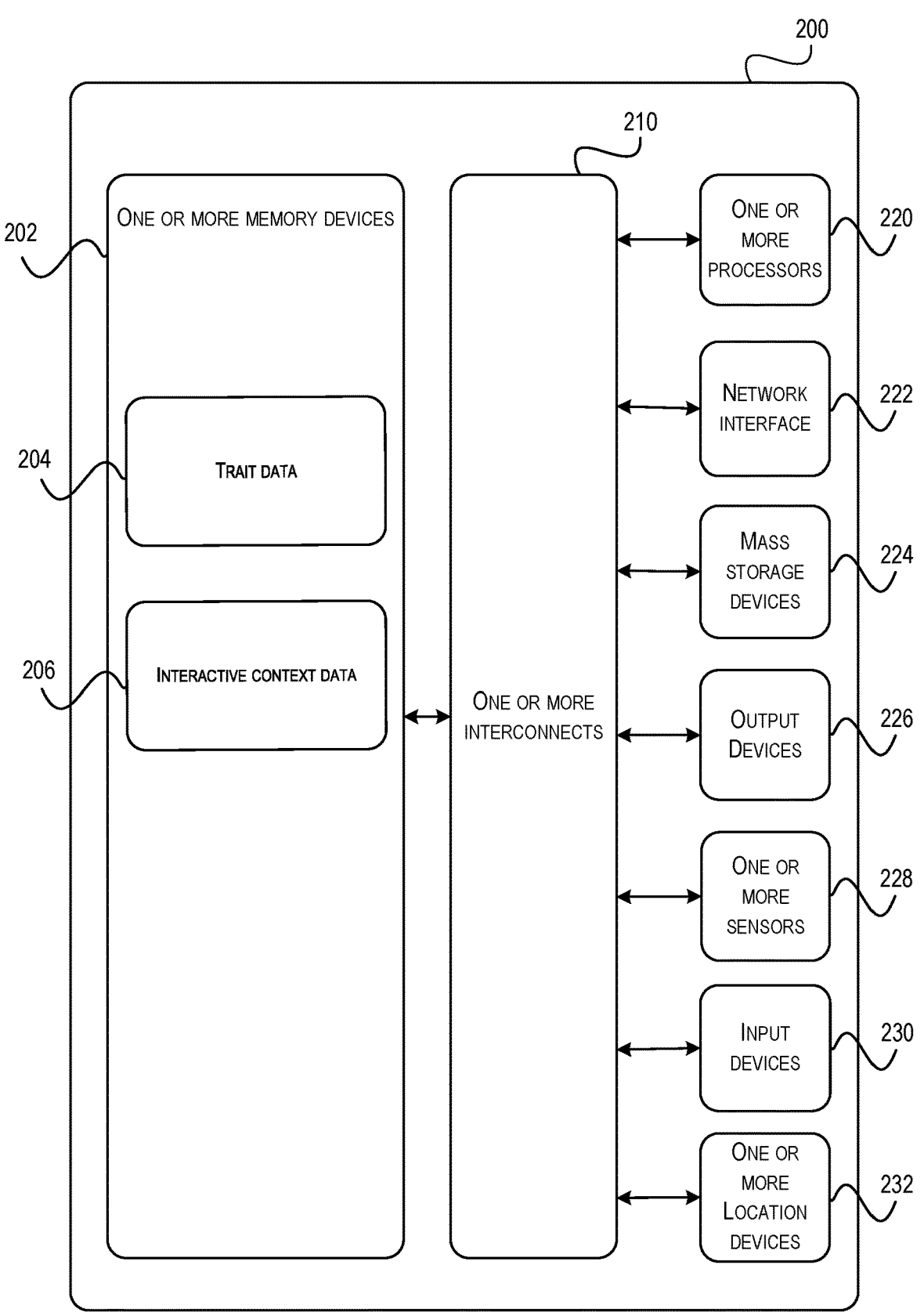
FIG. 2 depicts a diagram of an example computing device according to example embodiments of the present disclosure.

FIG. 2 depicts a block diagram of an example computing device according to example embodiments of the present disclosure. A computing device 200 can comprise one or more attributes and/or capabilities of the computing device 102, the server computing system 130, and/or the training computing system 150. Furthermore, the computing device 200 can be configured to perform one or more operations and/or implement one or more applications that can be performed and/or executed by the computing device 102, the server computing system 130, and/or the training computing system 150. For example, the computing device 200 can implement an application that can access (e.g., via the Internet) a virtual environment in which a user can control an avatar via the computing device 200.

As described with respect to FIG. 2, the computing device 200 can comprise one or more memory devices 202, trait data 204, interactive context data 206, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the trait data 204 and/or the interactive context data 206). Further, the one or more memory devices 202 can comprise one or more non-transitory computer-readable storage media, including RAM, ROM, EEPROM, EPROM, solid state drives (SSDs), and/or hard disk drives (HDDs). The information and/or data stored by the one or more memory devices 202 can be executed by the one or more processors 220 which can cause the computing device 200 to perform operations including one or more operations associated with detecting a plurality of inputs to control an avatar that is represented in a virtual environment, determining an interactive context associated with one or more states of the avatar, generating a plurality of traits associated with a representation of the avatar, and/or generating one or more modifications to the one or more states of the avatar (e.g., modifications of a visual representation of the avatar) in the virtual environment.

The trait data 204 can comprise one or more portions of data (e.g., the data 116, the data 136, and/or the data 156, which are described with respect to FIG. 1) and/or instructions (e.g., the instructions 118, the instructions 138, and/or the instructions 158 which are described with respect to FIG. 1) that are stored in the one or more memory devices 114, the one or more memory devices 134, and/or the one or more memory devices 154, respectively. Furthermore, the trait data 204 can comprise information associated with one or more traits of an avatar that is used in a virtual environment. In some embodiments, the trait data 204 can be received from one or more computing systems (e.g., the server computing system 130 described with respect to FIG. 1) which can comprise one or more computing systems that are remote from the computing device 200.

The interactive context data 206 can comprise one or more portions of data (e.g., the data 116, the data 136, and/or the data 156, which are described with respect to FIG. 1) and/or instructions (e.g., the instructions 118, the instructions 138, and/or the instructions 158 which are described with respect to FIG. 1) that are stored in the one or more memory devices 114, the one or more memory devices 134, and/or the one or more memory devices 154, respectively. Furthermore, the interactive context data 206 can comprise information associated with one or more interactive contexts that may be generated based on one or more states of a virtual environment, one or more states of an avatar, and/or a plurality of inputs. In some embodiments, the interactive context data 206 can be received from one or more computing systems (e.g., the server computing system 130 described with respect to FIG. 1) which can comprise one or more computing systems that are remote from the computing device 200.

The one or more interconnects 210 can comprise one or more interconnects or buses that can be used to send and/or receive one or more signals (e.g., electronic signals) and/or data (e.g., the trait data 204 and/or the interactive context data 206) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the location device 232. The one or more interconnects 210 can be arranged or configured in different ways. For example, the one or more interconnects 210 can be configured as parallel or serial connections. Further the one or more interconnects 210 can comprise: one or more internal buses that are used to connect the internal components of the computing device 200; and one or more external buses used to connect the internal components of the computing device 200 to one or more external devices. By way of example, the one or more interconnects 210 can comprise different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can comprise one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the trait data 204 and/or the interactive context data 206. The one or more processors 220 can comprise single or multiple core devices including a microprocessor, microcontroller, integrated circuit, and/or a logic device.

The network interface 222 can support network communications. The network interface 222 can support communication via networks including a local area network and/or a wide area network (e.g., the Internet). For example, the network interface 222 can allow the computing device 200 to communicate with the computing device 102 via the network 104.

The one or more mass storage devices 224 (e.g., a hard disk drive and/or a solid-state drive) can be used to store data including the trait data 204 and/or the interactive context data 206. The one or more output devices 226 can comprise one or more display devices (e.g., LCD display, OLED display, Mini-LED display, microLED display, plasma display, and/or CRT display), one or more light sources (e.g., LEDs), one or more loudspeakers, and/or one or more haptic output devices.

The one or more sensors 228 can be configured to detect various states and can comprise one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of a security policy. In some embodiments, the one or more sensors 228 can be part of an extended reality device that a user may use to interact with a virtual environment.

The one or more input devices 230 can comprise a gamepad, a joystick, one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to capture a user's gestures which can be recognized by the computing device 200 and used to control an avatar within a virtual environment).

Although the one or more memory devices 202 and the one or more mass storage devices 224 are depicted separately in FIG. 2, the one or more memory devices 202 and the one or more mass storage devices 224 can be regions within the same memory module. The computing device 200 can comprise one or more additional processors, memory devices, network interfaces, which can be provided separately or on the same chip or board. The one or more memory devices 202 and the one or more mass storage devices 224 can comprise one or more computer-readable media, including, but not limited to, non-transitory computer-readable media, RAM, ROM, hard disk drives (HDDs), solid state drives (SSDs), and/or other memory devices.

The one or more memory devices 202 can store sets of instructions for applications including an operating system that can be associated with various software applications or data. For example, the one or more memory devices 202 can store sets of instructions for one or more applications to generate a virtual environment that can comprise an avatar that is controlled via the computing device 200. In some embodiments, the one or more memory devices 202 can be used to operate or execute a general-purpose operating system that operates on mobile computing devices and/or and stationary devices, including extended reality devices, smartphones, laptop computing devices, tablet computing devices, and/or desktop computers.

The software applications that can be operated or executed by the computing device 200 can comprise applications associated with the computing device 102, the server computing system 130, and/or the training computing system 150 that are described with respect to FIG. 1. Further, the software applications that can be operated and/or executed by the computing device 200 can comprise native applications, web services, and/or web-based applications.

The location device 232 can comprise one or more devices or circuitry for determining the location of the computing device 200. For example, the location device 232 can determine an actual (e.g., latitude, longitude, and elevation) and/or relative position of the computing device 200 by using a satellite navigation positioning system (e.g., a GPS system, a Galileo positioning system, the GLObal Navigation satellite system (GLONASS), the BeiDou Satellite Navigation and Positioning system), and/or an inertial navigation system.

Figure 3:
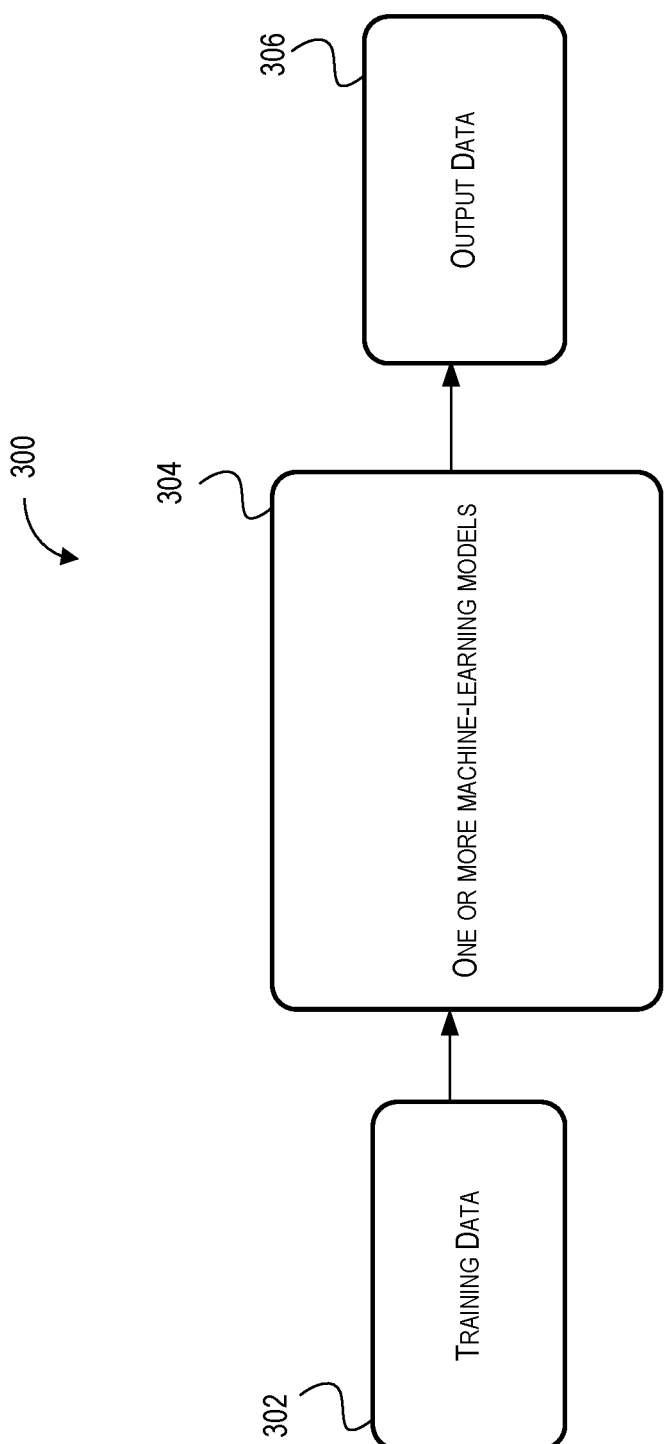
FIG. 3 depicts a diagram of an example machine-learning model according to example embodiments of the present disclosure.

FIG. 3 depicts a diagram of an example machine-learning model according to example embodiments of the present disclosure. The machine-learning model described with respect to FIG. 3 can be generated and/or determined by a computing system or computing device that includes one or more features of the computing device 102, the server computing system 130, and/or the training computing system 150, which are described with respect to FIG. 1; and/or the computing device 200 that is described with respect to FIG. 2. As shown in FIG. 3, the machine-learning system 300 includes training data 302, one or more machine-learning models 304, and output 306.

The training data 302 can comprise a plurality of inputs including the plurality of inputs described herein. The plurality of inputs can comprise one or more inputs that are based on evaluation of user inputs (e.g., actual real-world user inputs that are used to control an avatar in a virtual environment) and/or synthetic inputs that can be generated based on some combination of an algorithm and/or real-world user inputs. The plurality of inputs can comprise one or more communication inputs that can be used to communicate with other avatars (e.g., avatars controlled by other users) and/or virtual objects in a virtual environment. For example, the one or more communication inputs can comprise one or more text inputs (e.g., written input used to communicate with other users and/or issue commands in a virtual environment). Further, the one or more communication inputs can comprise one or more spoken inputs (e.g., words or commands spoken into a microphone by a user) that can be used to communicate with other users, control virtual objects in a virtual environment, and/or interact with virtual objects in a virtual environment. The one or more communication inputs used to configure and/or train the one or more machine-learning models 304 can comprise text or recordings of voices used to interact with the virtual environment.

The plurality of inputs can comprise one or more kinetic inputs that can be used to control the movement of objects (e.g., an avatar and/or objects associated with an avatar) in a virtual environment. Further, the one or more kinetic inputs can be used to control the direction in which an avatar moves in a virtual environment, actions (e.g., gesturing, running, jumping, and/or crouching) in a virtual environment, and/or the speed with which an avatar moves in a virtual environment. The one or more kinetic inputs used to configure and/or train the one or more machine-learning models 304 can comprise data based on the kinetic input used to control an avatar in the virtual environment.

The plurality of inputs can comprise one or more visual inputs that can be used to modify a visual representation (e.g., appearance) of objects (e.g., an avatar and/or objects associated with an avatar) in a virtual environment. The one or more visual inputs can be used to modify the dimensions of an object (e.g., an avatar), textures (e.g., colors and/or patterns mapped to surfaces of a three-dimensional model of an object) of an object, and/or a shape of an object. Further, the one or more visual inputs can comprise one or more inputs to modify the facial features of an avatar, attire worn by an avatar, and/or implements used by an avatar in a virtual environment. The one or more visual inputs used to configure and/or train the one or more machine-learning models 304 can comprise images and/or mesh information (e.g., three-dimensional mesh or two-dimensional mesh) based on the visual representation of an avatar in the virtual environment.

The plurality of inputs can comprise one or more aural inputs that can be used to modify aural features (e.g., sounds) of objects (e.g., an avatar and/or objects associated with an avatar) in a virtual environment. The one or more aural inputs can be used to modify one or more sounds associated with an object (e.g., an avatar and/or an object associated with the avatar). For example, Further, the one or more aural inputs can comprise one or more inputs to modify the sound effects (e.g., the sound of footsteps) generated when an avatar moves in a virtual environment and/or the sound effects generated when an avatar uses and/or interacts with an object in the virtual environment. The one or more aural inputs used to configure and/or train the one or more machine-learning models 304 can comprise data (e.g., MIDI data) and/or recordings of sound effects associated with an avatar and/or virtual environment.

The one or more machine-learning models 304 can be configured and/or trained to generate a plurality of traits based on input comprising the training data 302. The one or more machine-learning models 304 may comprise the one or more machine-learning models 304 can be configured and/or trained using supervised learning, unsupervised learning, and/or semi-supervised learning. Further, the one or more machine-learning models may use one or more algorithms and/or machine-learning structures including one or more neural networks (e.g., convolutional neural networks), reinforcement learning, one or more decision trees, and/or one or more support vector machines. Additionally, each of the one or more machine-learning models can be configured to operate alone or in combination with one or more other machine-learning models of the one or more machine-learning models 304.

The one or more machine-learning models 304 can comprise a plurality of parameters associated with weights that can be modified as the one or more machine-learning models 304 are configured and/or trained. Configuring and/or training the one or more machine-learning models 304 can comprise modifying the weights associated with the plurality of parameters based on the extent to which each of the plurality of parameters contributes to increasing or decreasing the accuracy of output generated by the one or more machine-learning models 304. For example, the one or more machine-learning models 304 can comprise a plurality of parameters corresponding to a plurality of traits associated with the representation of an avatar in a virtual environment. In the process of training the one or more machine-learning models 304, the weighting of the plurality of parameters can be modified based on the extent to which each of the plurality of parameters contributes to accurately modifying a representation (e.g., visual representation, aural representation, and/or kinetic representation) of an avatar and/or a virtual environment comprising the avatar.

Configuring and/or training the one or more machine-learning models 304 can comprise the use of a cost function that can be used to minimize the error (e.g., inaccuracy) between output of the one or more machine-learning models 304 and a set of ground truth values corresponding to accurate output. For example, the training data can comprise a plurality of kinetic inputs used to control the movement of an avatar in a virtual environment. The ground-truth data may indicate values associated with assertiveness traits based on the plurality of kinetic inputs. For example, kinetic inputs that bring an avatar closer to another avatar controlled by another user can be associated with a higher value of an assertiveness trait than kinetic inputs that move an avatar further away from the avatars of other users. Accurate output by the one or more machine-learning models 304 can comprise accurately identifying kinetic inputs that exceed an assertiveness trait threshold. Inaccurate output by the one or more machine-learning models 304 can comprise not accurately identifying kinetic inputs that exceed the assertiveness trait threshold. As the one or more machine-learning models 304 are configured and/or trained, the weighting of the plurality of parameters of the one or more machine-learning models 304 can be modified until the error associated with the output of the one or more machine-learning models 304 is minimized to a predetermined level (e.g., a level associated with 98% accuracy of predicting traits associated with inputs by a user). Configuring and/or training the one or more machine-learning models 304 can be performed over a plurality of rounds and/or iterations. Configuring and/or training the one or more machine-learning models 304 can be concluded when a predetermined level of accuracy of the one or more machine-learning models 304 is achieved. Additionally, the one or more machine-learning models 304 can be periodically retrained based on updated training data.

Figure 4:
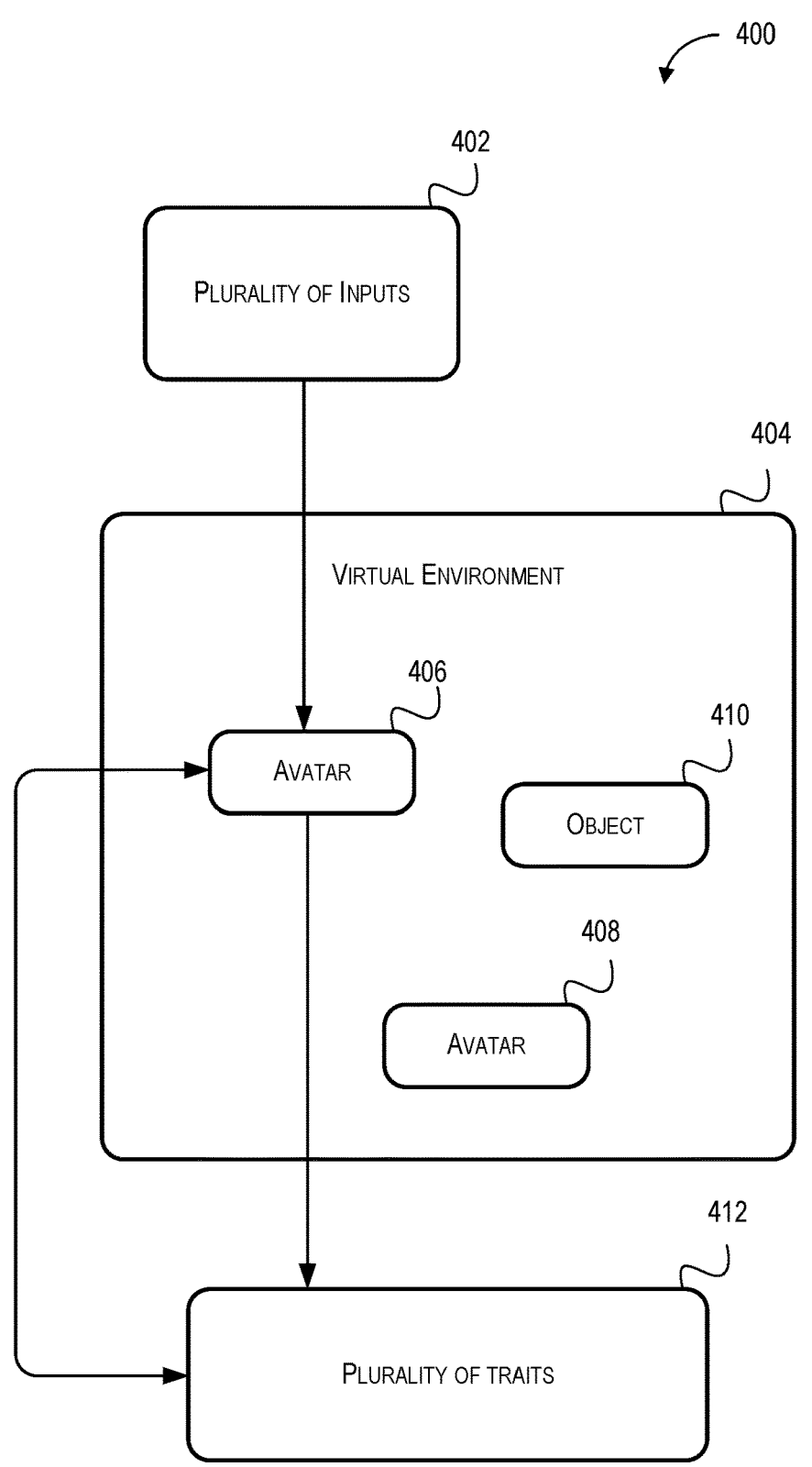
FIG. 4 depicts an example of a traits framework according to example embodiments of the present disclosure.

FIG. 4 depicts an example of a traits framework according to example embodiments of the present disclosure. The traits framework described with respect to FIG. 4 can be implemented on a computing system or computing device that includes one or more features of the computing device 102, the server computing system 130, the training computing system 150, which are described with respect to FIG. 1; and/or the computing device 200 that is described with respect to FIG. 2. As shown in FIG. 4, the traits framework 400 includes a plurality of inputs 402, a virtual environment 404, and avatar 406, an avatar 408, an object 410 (e.g., a virtual object that is represented within the virtual environment 404), and a plurality of traits 412.

The plurality of inputs 402 can comprise input that can be used to control an avatar within virtual environment 404. For example, the plurality of inputs can be used to control the movement and/or actions of an avatar (e.g., cause the avatar to move in a certain direction or perform some action) that is represented (e.g., visually represented) on a display device, control communication by the avatar (e.g., chat with other avatars in the virtual environment 404), and/or configure one or more states of the avatar (e.g., change the visual appearance and/or other features associated with the avatar).

The plurality of inputs 402 can comprise inputs to a tactile detection device (e.g., a keyboard, mouse, touch screen, stylus, and/or gamepad that can be actuated based on tactile input) that can be configured to detect tactile inputs, a motion sensing device (e.g., motion sensors including gyroscopes and/or accelerometers) that can be configured to detect motion inputs (e.g., movement of a user's head, hands, and/or body), and/or a microphone that can be configured to capture and/or recognize voice inputs (e.g., recognize voice commands to perform some action such as causing the avatar to move or causing the avatar to perform some action).

The avatar 406 can comprise a representation (e.g., visual representation) of an object that can be modified based on the plurality of inputs 402 and/or be controlled by the plurality of inputs 402. For example, the avatar 406 can comprise a representation of a person that is controlled by the plurality of inputs 402 caused by a user. In this example, the plurality of inputs 402 can be used to control the avatar 406 and a different plurality of inputs (not shown) can be used to control the avatar 408. For example, the avatar 408 can be controlled based on a different plurality of inputs that are caused by a user that is different from the user that generated the plurality of inputs 402. Further, based on the plurality of inputs 402, the avatar 406 can interact with the avatar 408 and/or the object 410. For example, the plurality of inputs can comprise one or more text inputs or one or more audio inputs (e.g., voice input) that can be expressed through the avatar 406 and used to communicate with the user that controls the avatar 408. Further, if the avatar 408 represents a person and the object 410 represents a virtual object (e.g., a virtual cup), the plurality of inputs 402 can be used to cause the avatar 408 to pick up the object 410 and perform an action (e.g., drink from the cup).

Actions performed by the avatar 406 (e.g., the avatar 406 interacting with other avatars or virtual objects in the virtual environment 404), changes to one or more states of the avatar 406 (e.g., changes to the visual appearance of the avatar 406), and/or changes to one or more states of the virtual environment 404 (e.g., changes caused by the avatar 406) can be detected. The actions and/or changes associated with the avatar 406 can be used to generate and/or modify the plurality of traits 412. Further, actions and/or changes caused by the avatar 406 can be detected and classified (e.g., classified using a machine-learning model). For example, a frequency of the avatar 406 communicating with other avatars (e.g., the avatar 408) may cause an extroversion trait to be generated and/or modified. A greater frequency of the avatar 406 communicating with other avatars may cause values associated with the extroversion trait to be generated and/or modified such that the avatar 406 is determined to be more extroverted. A lower frequency of the avatar 406 communicating with other avatars may cause values associated with a general extroversion trait to be generated and/or modified such that the avatar 406 is determined to be less extroverted.

Further, the type of communication performed by the avatar 406 can be determined and used to generate and/or modify the extroversion trait associated with the avatar 406. For example, text-based communication can be used to modify traits associated with text-based communication which may be different from communication traits associated with voice-based communication.

Additionally, a tone of communication by the avatar 406 can be determined (e.g., determined by inputting text input into a machine-learning model that is configured to determine the tone of communications) and various traits can be generated and/or modified based on the tone. For example, if the avatar 406 uses more energetic language or outgoing language, an extroversion trait can be modified to indicate that the avatar 406 is more extroverted. Further, the amount and/or rate of communication by the avatar 406 can be used to generate and/or modify an extroversion trait. For example, if the avatar 406 generates a greater number of words in a communication, the extroversion trait can be generated and/or modified to indicate greater extroversion. The plurality of traits 412 can be generated and/or modified based on an interactive context associated with the virtual environment 404. The interactive context of the virtual environment 404 can comprise a communication context, a control context, a configuration context, and/or an environmental context which are described herein with respect to FIG. 5. For example, an interactive context comprising a configuration context can cause traits that are associated with configuration of an avatar but that may not be associated with other aspects of the avatar.

Further, the plurality of traits 412 can be used to generate and/or modify one or more features of the avatar 406 in the virtual environment 404. The one or more features of the avatar 406 can comprise visual features, kinetic features, aural features, and/or communication features which are described herein with respect to FIG. 6. For example, if avatar 406 is associated with traits indicating a high level of happiness, the visual features of avatar 406 can comprise brighter colors and a smile on the face of the avatar 406, the kinetic features of the avatar 406 can be more enthusiastic (e.g., a bouncy gait), the aural features of the avatar 406 can comprise cheerful sounds (e.g., cheerful laughter), and/or communication features of the avatar 406 can comprise a brighter font color.

Figure 5:
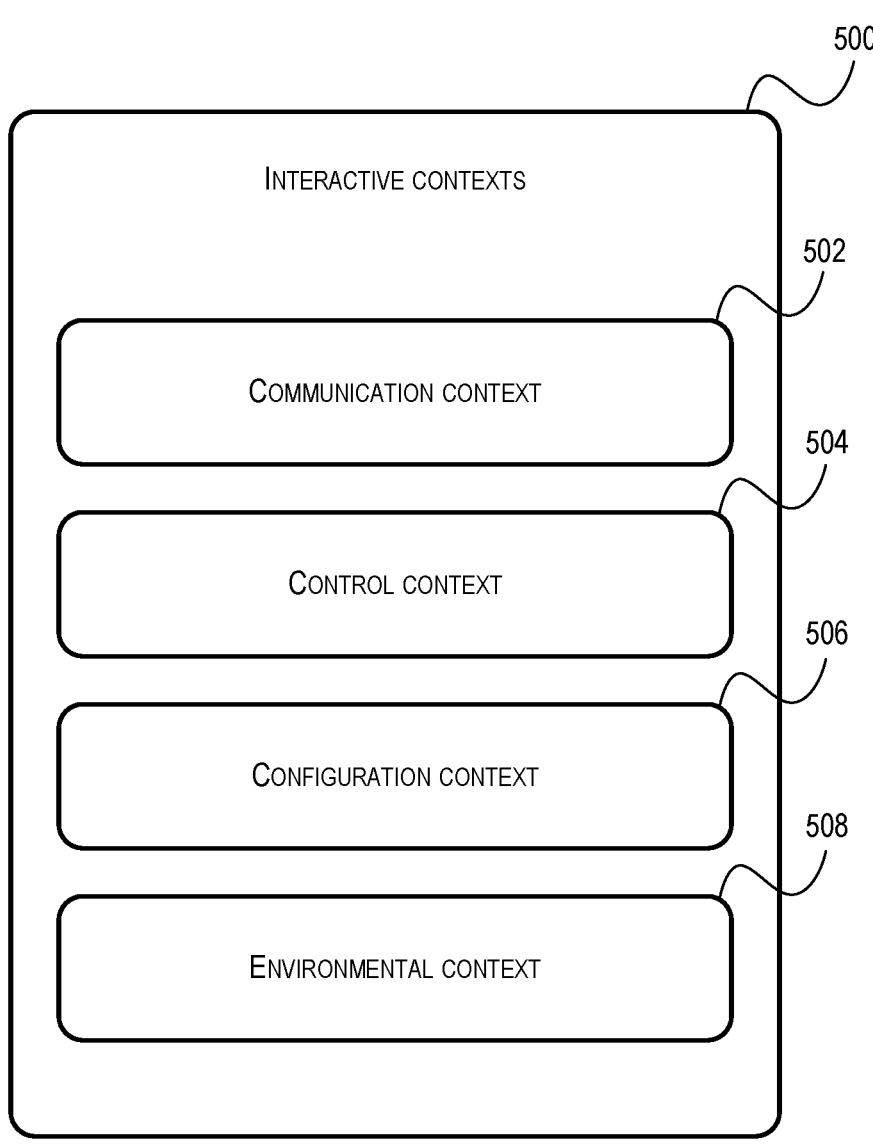
FIG. 5 depicts an example of interactive contexts of a virtual environment according to example embodiments of the present disclosure.

FIG. 5 depicts an example of interactive contexts of a virtual environment according to example embodiments of the present disclosure. The interactive contexts described with respect to FIG. 5 can be generated and/or modified by a computing system or computing device that includes one or more features of the computing device 102, the server computing system 130, and/or the training computing system 150, which are described with respect to FIG. 1; and/or the computing device 200 that is described with respect to FIG. 2. As shown in FIG. 5, the interactive context 500 includes a communication context 502, a control context 504, a configuration context 506, and an environmental context 508.

The interactive contexts 500 can comprise interactive contexts of a virtual environment (e.g., the virtual environment 404 described with respect to FIG. 4). The interactive contexts 500 can be generated based on one or more states of an avatar and/or a virtual environment. Further, the interactive contexts 500 can be used in the generation and/or modification of traits (e.g., the plurality of traits 412 that are described with respect to FIG. 4) associated with an avatar (e.g., the avatar 406 that is described with respect to FIG. 4). The interactive contexts 500 can comprise the communication context 502, the control context 504, the configuration context 506, and/or the environmental context 508.

The communication context 502 can, for example, comprise an interactive context in which an avatar in a virtual environment communicates with entities in the virtual environment including other avatars). Different instances of the interactive contexts 500 can result in different traits being generated and/or modified. For example, the communication context 502 can result in the generation and/or modification of traits specifically associated with an avatar's mode of communication. If an avatar communicates via text chat, the color and/or font of the text can be modified based on a text communication context being associated with a text trait. Further, if an avatar communicates via voice chat, the sound of the avatar's voice (e.g., the avatar's voice based on the user's voice) can be modified based on a voice communication context being associated with a vocal trait.

The control context 504 can result in the generation and/or modification of traits associated with control of an avatar. The control context 504 can be based on the type of action that an avatar is performing. For example, if an avatar is being controlled in a competitive racing context, traits associated with the avatar's movement can be modified based on the control context. If the avatar is a spectator and not a participant of the competitive racing context, traits associated with the avatar's movement may not be modified or traits associated with spectating a racing event may be modified.

The configuration context 506 can result in the generation and/or modification of traits associated with an avatar's configuration. For example, if an avatar is being configured by a user, configuration traits (e.g., a configuration of a user interface used to configure an avatar's appearance) can be modified based on the configuration context.

In some embodiments, the environmental context 508 can be generated based on a location of an avatar in a virtual environment. For example, if an avatar is located in a portion of the virtual environment in which avatars can communicate with other avatars (e.g., other avatars controlled by other users), the interactive context can be determined to be an environmental context and traits associated with the environmental context can be generated and/or modified. By way of further example, the environmental context 508 can cause the generation and/or modification of traits associated with an avatar's environment (e.g., an environment in a virtual environment). For example, if an avatar is in a store or shop in a virtual environment, traits associated with prices in the store or shop can be modified based on the environmental context.

Figure 6:
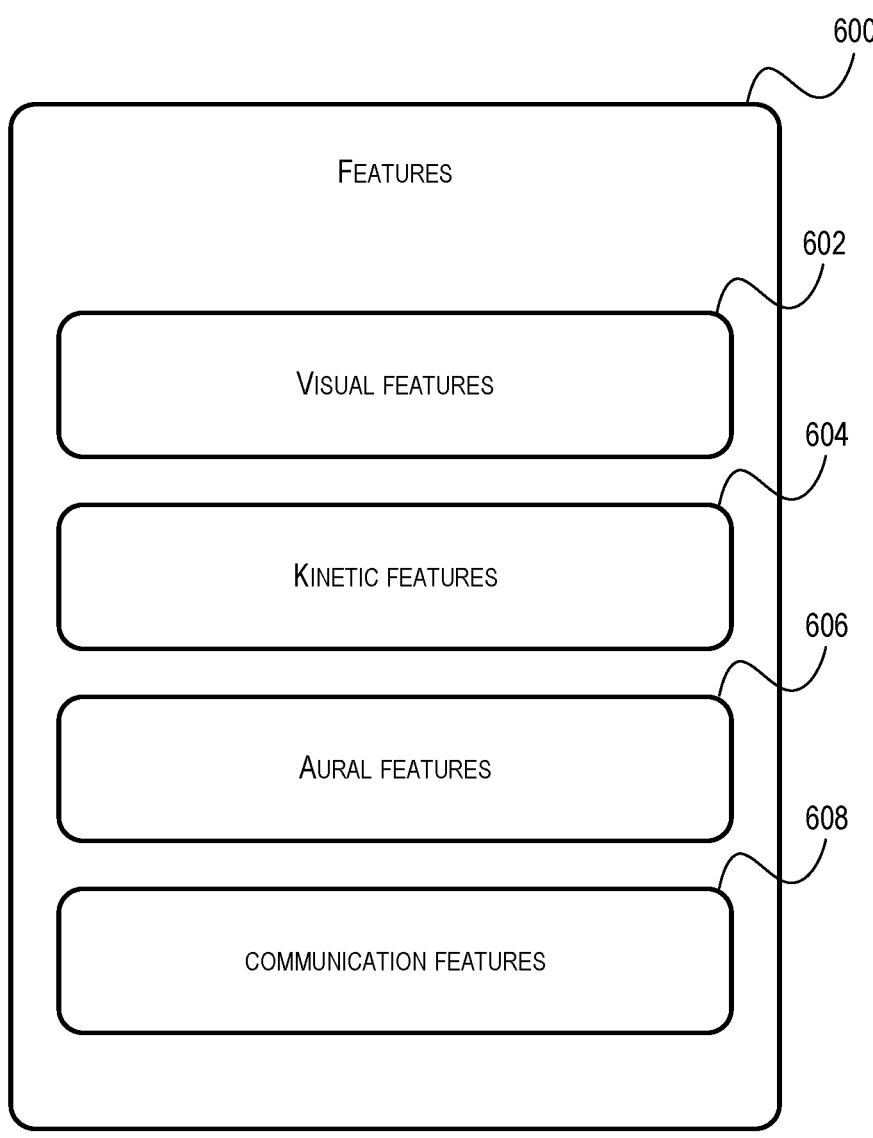
FIG. 6 depicts an example of features of an avatar in a virtual environment according to example embodiments of the present disclosure.

FIG. 6 depicts an example of features of an avatar in a virtual environment according to example embodiments of the present disclosure. The features described with respect to FIG. 6 can be generated and/or modified by a computing device or computing system that includes one or more features of the computing device 102, the server computing system 130, and/or the training computing system 150, which are described with respect to FIG. 1; and/or the computing device 200 that is described with respect to FIG. 2. As shown in FIG. 6, the features 600 comprise visual features 602, kinetic features 604, aural features 606, and communication features 608.

The features 600 can comprise one or more features of an avatar in a virtual environment. The features 600 can be generated and/or modified based on a plurality of inputs, an interactive context, one or more states of a virtual environment, and/or one or more states of an avatar. In this example, the visual features 602 can comprise one or more features associated with the visual representation of an avatar. The visual features 602 can comprise a shape, size, color, pattern, clothing, and/or implements (e.g., tools) associated with an avatar.

The kinetic features 604 can comprise one or more features associated with a kinetic representation of an avatar. The kinetic features 604 can comprise one or more speeds of movement (e.g., a walking speed, a running speed, and/or a swimming speed), acceleration, smoothness (e.g., smoothness of motion), one or more gestures, and/or one or more postures associated with an avatar. Further, the kinetic features 604 can indicate the way an avatar moves. For example, an avatar that represents a ballet dancer may have a different and more graceful set of the kinetic features 604 than an avatar that represents a non-dancer.

The aural features 606 can comprise one or more features associated with the aural representation of an avatar. The aural features 606 can comprise a loudness of an avatar, aural characteristics (e.g., a pitch of an avatar), one or more sound effects (e.g., footsteps or rustling clothing), and/or one or more pieces of music associated with an avatar. For example, the aural features 606 associated with an avatar that represents a mime may be quieter than the aural features 606 associated with an avatar that represents an opera singer.

The communication features 608 can comprise one or more features associated with a way in which communication associated with an avatar are represented within a virtual environment. The communication features 608 can comprise one or more preferred communication modalities (e.g., voice chat or text chat), communication filters (e.g., filters that remove profanity or certain subject matters that may be unsuitable for children) associated with an avatar.

Figure 7:
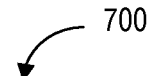
FIG. 7 depicts an example of modifying an avatar according to example embodiments of the present disclosure.
Figure 7:
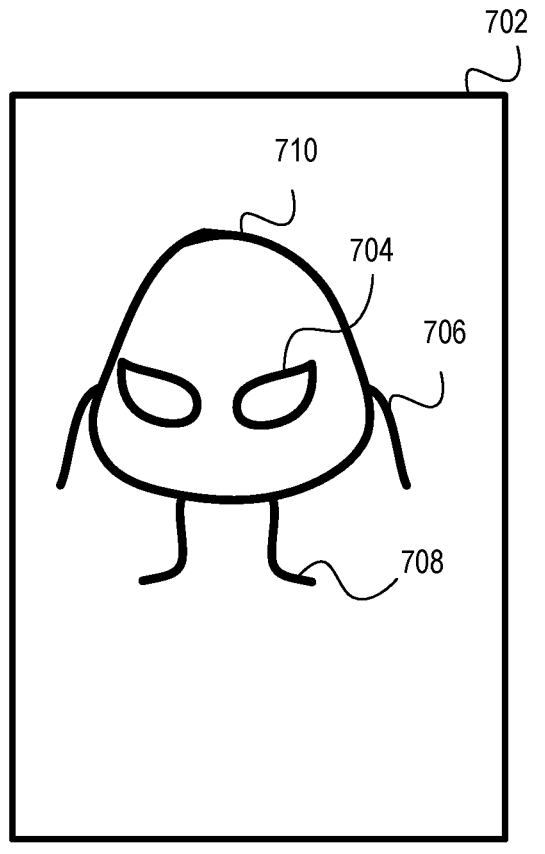
Figure 7:
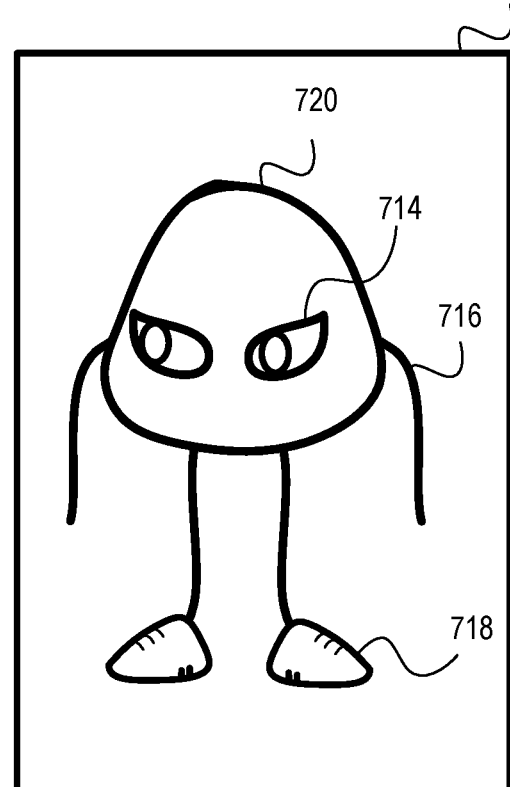

FIG. 7 depicts an example of modifying an avatar according to example embodiments of the present disclosure. The output described with respect to FIG. 7 can be generated and/or modified by a computing system or computing device that includes one or more features of the computing device 102, the server computing system 130, and/or the training computing system 150, which are described with respect to FIG. 1; and/or the computing device 200 that is described with respect to FIG. 2. As shown, FIG. 7 depicts an avatar 702, an avatar eye 704, an avatar arm 706, an avatar leg 708, an avatar head 710, a modified avatar 712, a modified avatar eye 714, a modified avatar arm 716, a modified avatar leg 718, and an avatar head 720.

In this example, the avatar 702 is in a first state at a first time and comprises an avatar that is a simple and stylized representation of an entity that comprises the avatar head 710, the avatar eye 704, the avatar arm 706, and/or the avatar leg 708. The avatar 702 and/or the avatar 712 can comprise a representation that is based on a plurality of inputs that were used to configure the visual representation of the avatar 702. For example, the avatar 702 and/or the avatar 712 can be generated based on a plurality of user inputs to configure the visual representation of the avatar 702 and/or avatar 712.

The avatar 702 and the avatar 712 can be based on a two-dimensional or three-dimensional model. Further, the avatar 702 and/or the avatar 712 can be represented in a virtual environment and controlled based on a plurality of inputs from a user. For example, the avatar 702 and/or the avatar 712 can be animated and made to walk in a virtual environment based on a plurality of inputs from a user.

In this example, the avatar 712 is based on the avatar 702 and can represent the avatar 702 in a second state at a second time that is after the first time associated with the avatar 702. The avatar 712 has been modified based on traits associated with a plurality of inputs to control the avatar 702, one or more interactive contexts associated with the avatar 702, one or more states of the avatar 702, and one or more states of the environment associated with the avatar 702. The modifications to avatar 702 that resulted in the avatar 712 comprise a modification of the visual representation of the avatar eye 704 to become the modified avatar eye 714 that is more realistic and in the avatar 712. The avatar eye 704 may have become modified based on the determination that the traits associated with the realism of an avatar were more heavily weighted as a result of the plurality of inputs to control the avatar 702. For example, the avatar eye 704 may have been modified based on traits associated with the avatar being in virtual environments that are more realistic and/or in virtual environments in which other avatar's have more detailed eyes.

Further, the modifications to avatar 702 that resulted in the avatar 712 comprise a modification of the visual representation of the avatar arm 706 to become the longer modified avatar arm 716 that is in the avatar 712. The avatar arm 706 may have been modified based on a determination that the traits associated with the activities (e.g., throwing activities) of an avatar were more heavily weighted as a result of the plurality of inputs to control the avatar 702. For example, the avatar arm 706 may have been modified based on traits associated with the avatar being in virtual environments that comprise sporting activities that involve throwing a ball.

Further, the modifications to avatar 702 that resulted in the avatar 712 comprise a modification of the visual representation of the avatar leg 708 to become the longer avatar leg 718 wearing a shoe that is in the avatar 712. The avatar leg 708 may have become modified based on the determination that the traits associated with the activities (e.g., running activities) of an avatar were more heavily weighted as a result of a plurality of inputs that were used to control the avatar 702. For example, the modified avatar leg 718 may have been modified based on traits associated with the avatar being in virtual environments that comprise sporting activities that involve running and which may comprise other avatars that wear shoes.

Figure 8:
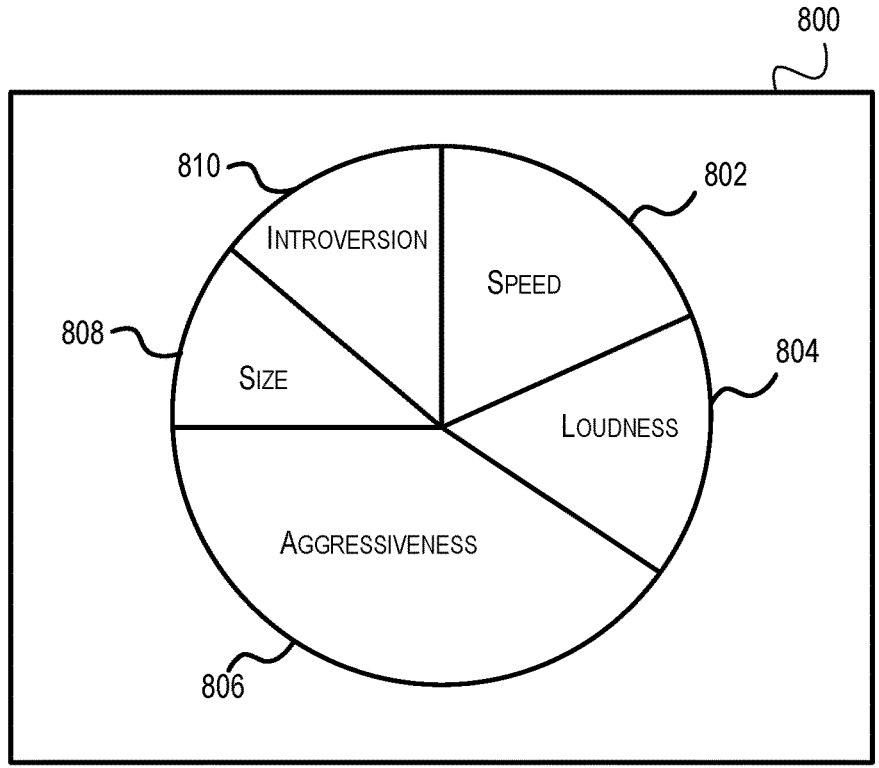
FIG. 8 depicts a flow diagram of a weighting of traits of an avatar according to example embodiments of the present disclosure.
Figure 8:
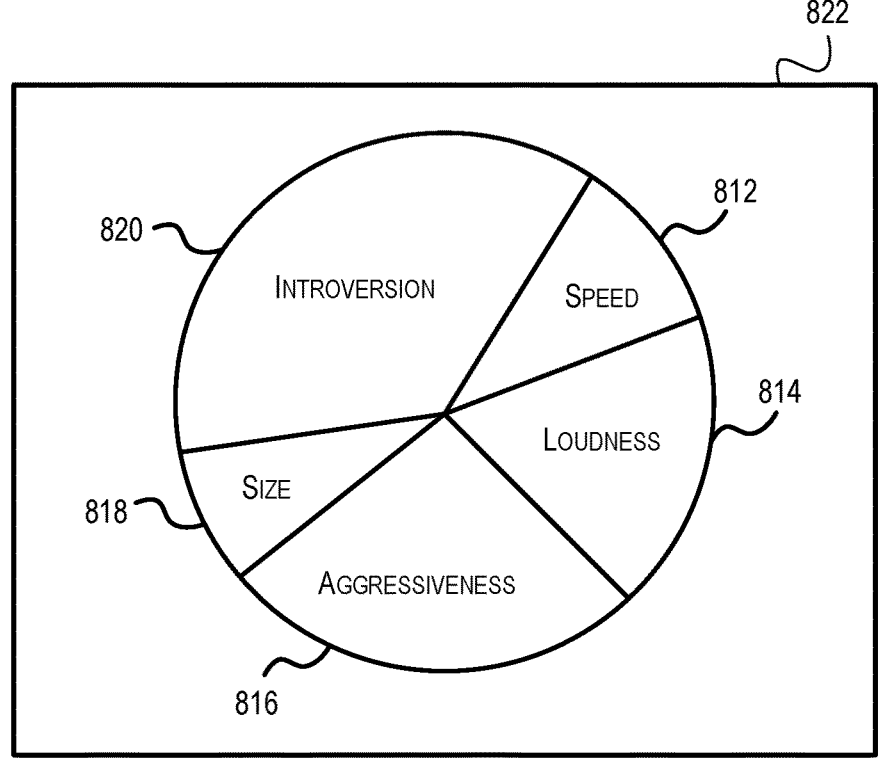

FIG. 8 depicts a flow diagram of a weighting of traits of an avatar according to example embodiments of the present disclosure. The weighting of traits described with respect to FIG. 8 can be generated and/or modified by a computing system or computing device that includes one or more features of the computing device 102, the server computing system 130, and/or the training computing system 150, which are described with respect to FIG. 1; and/or the computing device 200 that is described with respect to FIG. 2. As shown, FIG. 8 depicts a plurality of traits 800, a speed trait 802, a loudness trait 804, an aggressiveness trait 806, a size trait 808, an introversion trait 810, a speed trait 812, a loudness trait 814, an aggressiveness trait 816, a size trait 818, and an introversion trait 820.

In this example, the plurality of traits 800 and the plurality of traits 822 can comprise traits of different avatars or a different weighting of the traits of the same avatar at different times. Further, the plurality of traits 800 and the plurality of traits 822 can comprise a subset of traits or the entirety of the traits associated with one or more avatars. For example, the plurality of traits 800 can comprise five traits (e.g., speed, loudness, aggressiveness, size, and introversion) that are a subset of a total of fifty traits that include forty-five other traits that are different from the five traits described with respect to FIG. 8.

The plurality of traits can be used to modify one or more states and/or a representation (e.g., visual representation and/or aural representation) of an avatar. For example, the speed trait 802/812 can modify the speed with which an associated avatar can move in a virtual environment, the loudness trait 804/814 can modify the loudness with which an associated avatar communicates and/or moves in a virtual environment, the aggressiveness trait 806/816 can modify the types of gestures, postures, or facial expressions that are represented on an avatar when the avatar interacts with other avatars, the size trait 808/818 can modify the size of an avatar or some portion (e.g., head size, hand size, and/or foot size) of the avatar a virtual environment, and/or the introversion trait 810/820 can modify the appearance (e.g., shy appearance) or posture (e.g., boisterous posture) of an avatar in a virtual environment.

Further, if the plurality of traits 800 and the plurality of traits 822 have the same aggregate weighting with respect to the total weighting of traits for an avatar, an avatar associated with the plurality of traits 800 can move more speedily through a virtual environment than a different avatar associated with the plurality of traits 822 in which the speed trait 812 is less heavily weighted than the speed trait 802 of the plurality of traits 800.

The different weighting of the traits in the plurality of traits 800 and the plurality of traits 822 can be caused by different inputs that cause certain traits to become more or less heavily weighted. In some embodiments, the plurality of traits 800 and/or the plurality of traits 822 can have initial default values that can change over time as an avatar is controlled in a virtual environment.

Figure 9:
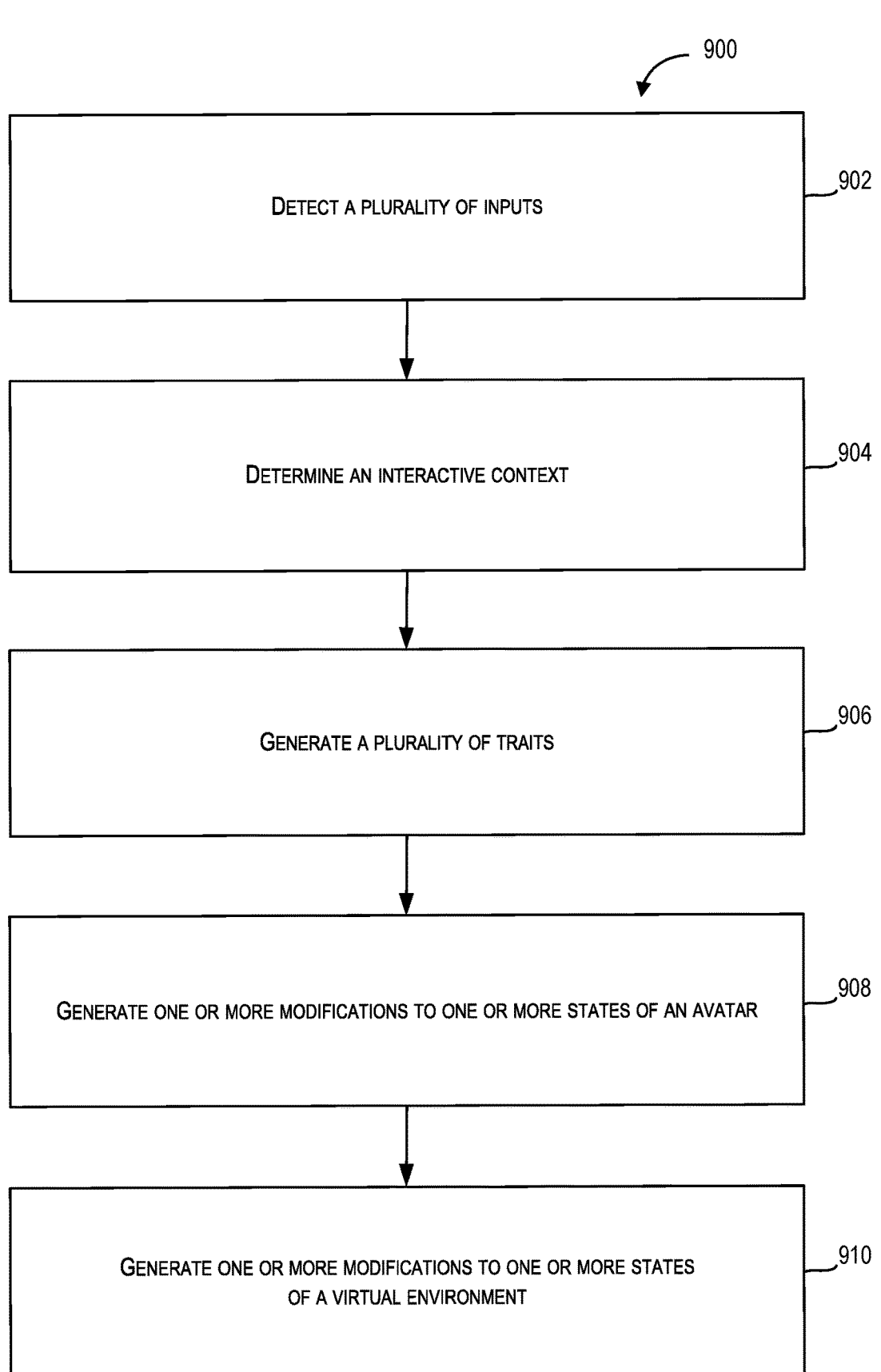
FIG. 9 depicts a flow diagram of an example method of generating avatars in a virtual environment according to example embodiments of the present disclosure.

FIG. 9 depicts a flow diagram of an example method of generating avatars in a virtual environment according to example embodiments of the present disclosure. One or more portions of the method 900 can be executed or implemented on one or more computing devices or computing systems including, for example, the computing device 102, the server computing system 130, and/or the training computing system 150; and/or the computing device 200 that is described with respect to FIG. 2. Further, one or more portions of the method 900 can be executed or implemented as an algorithm on the hardware devices or systems disclosed herein. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can comprise detecting a plurality of inputs. The plurality of inputs can comprise inputs to control an avatar that can be represented in a virtual environment. The plurality of inputs (e.g., inputs to one or more devices by a user) can be based on use of one or more devices (e.g., one or more devices that detect user inputs and cause the modification of one or more states of an avatar based on the detected user inputs) that can control actions of an avatar in a virtual environment. Further, the plurality of inputs can comprise one or more user inputs to a keyboard, mouse, stylus, touch screen, extended reality device, microphone, joystick, gamepad, and/or racing wheel. The plurality of inputs may control avatar movement, avatar communication, avatar appearance, avatar sounds, and/or one or more virtual objects associated with the avatar (e.g., virtual objects in the virtual environment that can be used by the avatar). The plurality of inputs may control movement (e.g., the direction of travel, jumping, crouching, walking, and/or running) of an avatar in a virtual environment. For example, the computing device 102 can detect the plurality of inputs which can comprise one or more combinations of inputs (e.g., a particular sequence and/or combination of the same type of input and/or different types of inputs). Further, the computing device 102 can be configured to detect the plurality of inputs via a communication network (e.g., a wireless and/or wired network which can comprise a LAN, WAN, or the Internet) through which one or more signals (e.g., electronic signals indicating the plurality of inputs) and/or data can be sent and/or received.

At 904, the method 900 can comprise determining an interactive context. The interactive context can be associated with and/or determined based on the plurality of inputs, one or more states of the avatar, and/or one or more states of the virtual environment. The interactive context can be based on the way in which the plurality of inputs are used to modify one or more states of the avatar in the virtual environment (e.g., inputs from a mouse that cause the avatar to take a virtual object in the virtual environment) and/or interact with the virtual environment (e.g., communicate with other avatars in the virtual environment). For example, the computing device 102 can use the plurality of inputs (e.g., inputs to a keyboard that generated text in the virtual environment) that were detected to determine that the interactive context comprises a communication context.

At 906, the method 900 can comprise generating a plurality of traits. The plurality of traits can comprise traits that can be used to indicate an avatar's visual features in the virtual environment (e.g., the avatar's size, shape, and/or coloring), an avatar's kinetic features in the virtual environment (e.g., the way an avatar moves in the virtual environment), an avatar's aural features in the virtual environment (e.g., the way an avatar sounds in the virtual environment), and/or an avatar's communication features (e.g., the way an avatar communicates in the virtual environment including the way in which communication by an avatar is presented). The plurality of traits can be based on the one or more states of the avatar and/or the interactive context. For example, the computing device 102 can generate a plurality of traits based on processing an interactive context and one or more states associated with an avatar in a virtual environment.

The plurality of traits can be associated with a representation of the avatar in the virtual environment. For example, if the plurality of inputs cause an avatar to move in a particular manner (e.g., moving at high speed), traits associated with an avatar's speed of movement can be generated and/or modified (e.g., traits of an avatar can be modified such that the avatar moves more speedily in a virtual environment).

At 908, the method 900 can comprise generating one or more modifications to the one or more states of the avatar.

Further, the one or more modifications can be based on the plurality of traits. For example, the one or more modifications of the one or more states of the avatar can correspond to the plurality of traits such that the one or more states of the avatar that are modified are similar to the corresponding plurality of traits. For example, a trait associated with the overall speed of an avatar can cause the generation of one or more modifications of the speed with which an avatar moves in the virtual environment.

The one or more states of an avatar can comprise one or more states associated with visual features, kinetic features, aural features, and/or communication features. Further, the one or more modifications can modify the one or more states associated with visual features, kinetic features, aural features, and/or communication features. For example, one or more visual features of an avatar (e.g., an avatar's facial features) can be modified based on one or more traits indicating that the avatar's is wearing make-up, one or more kinetic features of an avatar (e.g., an avatar's gait) can be modified based on one or more traits indicating that an avatar has become more graceful, one or more aural features of an avatar (e.g., sound effects caused by movement of an avatar) can be modified based on one or more traits indicating that the avatar's size is larger (e.g., larger and heavier, thereby resulting in the generation of louder footsteps when the avatar moves), and/or one or more communication features of an avatar (e.g., a font and font size used in text based communications by an avatar) can be modified (e.g., a larger and bolder type face in text based communications) based on one or more traits indicating that the avatar is more extroverted.

At 910, the method 900 can comprise generating one or more modifications to the one or more states of the virtual environment. Further, generation of the one or more modifications to the one or more states of the virtual environment can be based on the plurality of traits. The virtual environment (e.g., the virtual environment that is visible to a user that controls an avatar within an instance of the virtual environment that is presented to that user) can be modified based on the plurality of traits associated with the avatar being controlled by the user.

Further, the one or more modifications can comprise modifying a visual representation of the virtual environment. For example, the one or more modification can comprise modifications to the brightness of the virtual environment (e.g., traits associated with cheerfulness can cause modifications that brighten the virtual environment and traits associated with gloominess can cause modifications that darken the virtual environment). For example, based on traits associated with propriety and an aversion to profanity the computing device 102 can generate one or more modifications that remove or edit profanity (e.g., one or more profane words can be changes to one or more non-profane words that have a similar meaning) that is represented in the virtual environment.

FIG. 10 depicts a flow diagram of an example method of generating traits for avatars in a virtual environment according to example embodiments of the present disclosure. One or more portions of the method 1000 can be executed or implemented on one or more computing devices or computing systems including, for example, the computing device 102, the server computing system 130, and/or the training computing system 150; and/or the computing device 200 that is described with respect to FIG. 2. Further, one or more portions of the method 1000 can be executed and/or implemented as an algorithm on the hardware devices or systems disclosed herein. In some embodiments, one or more portions of the method 1000 can be performed as part of the method 900 that is described with respect to FIG. 9. Further, one or more portions of the method 1000 can be performed as part of generating a plurality of traits as described in 906 of the method 900 that is described with respect to FIG. 9. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can comprise inputting a plurality of inputs comprising one or more communication inputs into one or more machine-learning models that are configured to generate the plurality of traits based on the communication inputs. The one or more machine-learning models can be configured to receive communication inputs comprising user communications that can be input into the one or more machine-learning models (e.g., one or more large language models which can be configured and/or trained to parse and/or recognize the communication inputs and generate traits based on the parsed and recognized communication inputs. For example, the computing device 102 can implement one or more machine-learning models that are configured to receive text based on a plurality of inputs (e.g., communication inputs) from a keyboard and input the text into the one or more machine-learning model which can be configured and/or trained to parse and/or recognize the text and generate traits (e.g., traits reflecting the style or content of the text) based on the parsed and recognized text.

At 1004, the method 1000 can comprise inputting a plurality of kinetic inputs into one or more machine-learning models that are configured to generate a plurality of traits based on the one or more kinetic inputs. The one or more machine-learning models can be configured to receive kinetic inputs comprising user inputs to control movement of an avatar in a virtual environment that can be input into the one or more machine-learning model which can be configured and/or trained to classify the kinetic inputs and generate traits based on the classified kinetic inputs. For example, the computing device 102 can implement one or more machine-learning models that are configured to receive kinetic inputs based on a user's input to a gamepad that controls movement of an avatar in a virtual environment. The plurality of inputs (e.g., kinetic inputs) can be inputted into the one or more machine-learning model which can be configured and/or trained to classify the plurality of inputs and generate traits (e.g., traits way the avatar moves in the virtual environment) based on the classified plurality of inputs.

At 1006, the method 1000 can comprise modifying a weighting of the plurality of traits based on the one or more states of the virtual environment and/or the interactive context. For example, if one or more states of the virtual environment indicate that the avatar is located in a beauty pageant and the interactive context indicates that the avatar is a judge in the beauty pageant, a weighting of the plurality of traits associated with judging a beauty pageant (e.g., impartiality, aesthetic appreciation, and/or fashion sense) can be modified. The weighting of the plurality of traits can be positively correlated with an extent to which the plurality of traits modify the representation (e.g., visual representation) of the avatar. For example, if the computing device 102 heavily increases the weighting of traits associated with the attractiveness of an avatar, the visual representation can be heavily modified to increase the attractiveness of the avatar.

The technology discussed herein makes reference to computing systems that can include servers, clients, software applications, databases, and/or other computer-based systems. Further, the technology discussed herein also makes reference to actions performed by such systems and/or information sent to and from such computing systems. The inherent flexibility of computer-based systems allows for a great variety of possible configurations, combinations, and divisions of tasks and functionality between and among components. For instance, processes discussed herein can be implemented using a single device or component or multiple devices or components working in combination. Applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to achieve another additional embodiment. Thus, it is intended that the present disclosure covers such alterations, variations, and/or equivalents.

What is claimed is:

1. A computer-implemented method of generating avatars, the method comprising:

detecting, by a computing system comprising one or more processors, a plurality of inputs to control an avatar that is represented in a virtual environment;

determining, by the computing system, based on one or more states of the virtual environment that are modified by the plurality of inputs, an interactive context associated with one or more states of the avatar in the virtual environment;

generating, by the computing system, based on the one or more states of the avatar, the one or more states of the virtual environment, or the interactive context satisfying one or more conditions, a plurality of traits associated with a representation of the avatar in the virtual environment, wherein the satisfying the one or more conditions comprises the avatar performing, in a time interval, greater than a threshold number of actions associated with a trait of the plurality of traits; and generating, by the computing system, based on the plurality of traits, one or more modifications to the one or more states of the avatar, wherein the one or more modifications comprise modifying a visual representation of the avatar in the virtual environment.

2. The computer-implemented method of claim 1, wherein the virtual environment comprises a virtual reality environment, and wherein the avatar is represented as a three-dimensional model within the virtual reality environment.

3. The computer-implemented method of claim 1, wherein the plurality of inputs comprise one or more communication inputs, and wherein the generating, by the computing system, based on the one or more states of the virtual environment and the interactive context, a plurality of traits associated with a representation of the avatar in the virtual environment comprises:

inputting, by the computing system, the plurality of inputs into a machine-learning model that is configured to generate the plurality of traits based on the communication inputs.

4. The computer-implemented method of claim 3, wherein the one or more communication inputs comprise one or more text inputs or one or more spoken inputs.

5. The computer-implemented method of claim 1, wherein the plurality of inputs comprise one or more kinetic inputs to control movement of the avatar in the virtual environment, and wherein the generating, by the computing system, based on the one or more states of the virtual environment and the interactive context, a plurality of traits associated with a representation of the avatar in the virtual environment comprises:

inputting, by the computing system, the plurality of inputs into a machine-learning model that is configured to generate the plurality of traits based on the one or more kinetic inputs.

6. The computer-implemented method of claim 1, wherein the generating, by the computing system, based on the one or more states of the virtual environment and the interactive context, the plurality of traits associated with the representation of the avatar in the virtual environment comprises:

modifying, by the computing system, a weighting of one or more of the plurality of traits based on the one or more states of the virtual environment and the interactive context.

7. The computer-implemented method of claim 6, wherein the weighting of the plurality of traits is positively correlated with an extent to which the plurality of traits modify the visual representation of the avatar.

8. The computer-implemented method of claim 1, further comprising:

generating, by the computing system, based on the plurality of traits, one or more modifications to the one or more states of the virtual environment, wherein the one or more modifications comprise modifying a visual representation of the virtual environment that is presented to a user.

9. The computer-implemented method of claim 1, wherein the virtual environment comprises an augmented reality environment that is based on one or more real-world states, and wherein the plurality of inputs comprise one or more inputs associated with one or more real-world objects associated with the one or more real-world states.

10. The computer-implemented method of claim 1, wherein the one or more states of the avatar are based on one or more aural features of the avatar, and wherein the one or more modifications comprise modifying the one or more aural features of the avatar.

11. The computer-implemented method of claim 9, wherein the one or more aural features comprise sound effects associated with the avatar.

12. The computer-implemented method of claim 1, wherein the one or more states of the avatar are based on one or more kinetic features of the avatar, wherein the one or more modifications comprise modifying the one or more kinetic features of the avatar, and wherein the one or more kinetic features comprise a movement speed of the avatar or one or more gestures of the avatar.

13. The computer-implemented method of claim 1, wherein the one or more states of the avatar are based on a three-dimensional mesh of the avatar, and wherein the one or more modifications comprise modifying a shape of the three-dimensional mesh.

14. The computer-implemented method of claim 1, wherein the one or more states of the avatar are based on a plurality of textures that are mapped to a three-dimensional mesh of the avatar, and wherein the one or more modifications comprise modifying the plurality of textures.

15. One or more tangible, non-transitory computer-readable media storing computer-readable instructions that when executed by one or more processors cause the one or more processors to perform operations, the operations comprising:

detecting a plurality of inputs to control an avatar that is represented in a virtual environment;

determining, based on one or more states of the virtual environment that are modified by the plurality of inputs, an interactive context associated with one or more states of the avatar in the virtual environment;

generating, based on the one or more states of the avatar, the one or more states of the virtual environment, or the interactive context satisfying one or more conditions, a plurality of traits associated with a representation of the avatar in the virtual environment, wherein the satisfying the one or more conditions comprises the avatar performing, in a time interval, greater than a threshold number of actions associated with a trait of the plurality of traits; and generating, based on the plurality of traits, one or more modifications to the one or more states of the avatar, wherein the one or more modifications comprise modifying a visual representation of the avatar in the virtual environment.

16. The one or more tangible non-transitory computer-readable media of claim 15, wherein the operations further comprise:

generating, based on the plurality of traits, one or more modifications to the one or more states of the virtual environment, wherein the one or more modifications comprise modifying a visual representation of the virtual environment that is presented to a user.

17. The one or more tangible non-transitory computer-readable media of claim 15, wherein the one or more states of the avatar comprise a plurality of textures that are mapped to a three-dimensional mesh of the avatar, and wherein the one or more modifications comprise modifying the plurality of textures.

18. A computing system comprising:

one or more processors;

one or more non-transitory computer-readable media storing instructions that when executed by the one or more processors cause the one or more processors to perform operations comprising:

detecting a plurality of inputs to control an avatar that is represented in a virtual environment;

determining, based on one or more states of the virtual environment that are modified by the plurality of inputs, an interactive context associated with one or more states of the avatar in the virtual environment;

generating, based on the one or more states of the avatar, the one or more states of the virtual environment, or the interactive context satisfying one or more conditions, a plurality of traits associated with a representation of the avatar in the virtual environment, wherein the satisfying the one or more conditions comprises the avatar performing, in a time interval, greater than a threshold number of actions associated with a trait of the plurality of traits; and generating, based on the plurality of traits, one or more modifications to the one or more states of the avatar, wherein the one or more modifications comprise modifying a visual representation of the avatar in the virtual environment.

19. The computing system of claim 18, wherein the one or more states of the avatar comprise a plurality of textures that are mapped to a three-dimensional mesh of the avatar, and wherein the one or more modifications comprise modifying the plurality of textures.

20. The computing system of claim 18, wherein the operations further comprise:

generating, based on the plurality of traits, one or more modifications to the one or more states of the virtual environment, wherein the one or more modifications comprise modifying a visual representation of the virtual environment that is presented to a user.

\* \* \* \* \*